United States Patent
Onyon et al.

(10) Patent No.: US 7,634,509 B2
(45) Date of Patent: Dec. 15, 2009

(54) PERSONAL INFORMATION SPACE MANAGEMENT SYSTEM AND METHOD

(75) Inventors: Richard M. Onyon, San Jose, CA (US); Liam J. Stannard, Lawrenceville, GA (US); Leighton A. Ridgard, Ellenwood, GA (US)

(73) Assignee: FusionOne, Inc., San Jose, CA (US)

( * ) Notice: Subject to any disclaimer, the term of this patent is extended or adjusted under 35 U.S.C. 154(b) by 351 days.

(21) Appl. No.: 10/704,443

(22) Filed: Nov. 7, 2003

(65) Prior Publication Data

US 2005/0102257 A1    May 12, 2005

(51) Int. Cl.
G06F 12/00    (2006.01)
G06F 17/30    (2006.01)
(52) U.S. Cl. .................................................... 707/201
(58) Field of Classification Search .................. 707/201
See application file for complete search history.

(56) References Cited

U.S. PATENT DOCUMENTS 4,887,212 A    12/1989  Zamora et al. ............. 364/419

(Continued)

FOREIGN PATENT DOCUMENTS

CN    1998-106683    4/1998

(Continued)

OTHER PUBLICATIONS

Gaskin, J.E. "Messaging—Instant Enterprise—Once a Novelty Item, IM is Becoming a More Serious Tool for Business Users", InternetWeek, No. 810, Apr. 24, 2000, p. 55.*

(Continued)

*Primary Examiner*—Luke S Wassum
(74) *Attorney, Agent, or Firm*—Haverstock & Owens LLP

(57) ABSTRACT

A system and method for organizing information in a personal information space. The personal information space includes at least one data source holding at least a portion of the personal information space. The system includes an agent for the data source which provides interaction information regarding data in the data source; and a interaction evaluation engine including one or more weighting characteristics for each interaction, and providing an output reflecting a weighting of one or more characteristics of the interaction. The method may comprise the steps of determining when an interaction between a contact on one of the contact data sources occurs; analyzing one or more characteristics of the interaction event to determine a at least one trait about the interaction; and generating a result based on said step of analyzing.

81 Claims, 11 Drawing Sheets

U.S. PATENT DOCUMENTS

| | | | |
|---|---|---|---|
| 5,111,398 A | 5/1992 | Nunberg et al. | 364/419 |
| 5,130,993 A | 7/1992 | Gutman et al. | 371/42 |
| 5,146,221 A | 9/1992 | Whiting et al. | 341/67 |
| 5,329,619 A | 7/1994 | Page et al. | 395/200 |
| 5,392,390 A | 2/1995 | Crozier | 395/161 |
| 5,418,854 A | 5/1995 | Kaufman et al. | 713/156 |
| 5,418,908 A | 5/1995 | Keller et al. | 395/200 |
| 5,483,352 A | 1/1996 | Fukuyama | 358/402 |
| 5,485,161 A | 1/1996 | Vaughn | 342/357.13 |
| 5,519,433 A | 5/1996 | Lappington et al. | 725/110 |
| 5,519,606 A | 5/1996 | Frid-Nielsen et al. | 364/401 |
| 5,543,789 A | 8/1996 | Behr et al. | 340/995 |
| 5,544,061 A | 8/1996 | Morimoto et al. | 340/995 |
| 5,561,446 A | 10/1996 | Montlick | 345/173 |
| 5,574,906 A | 11/1996 | Morris | |
| 5,588,009 A | 12/1996 | Will | 371/33 |
| 5,623,406 A | 4/1997 | Ichibah | 364/999.999 |
| 5,623,661 A | 4/1997 | Hon | 395/601 |
| 5,628,005 A | 5/1997 | Hurvig | 395/608 |
| 5,630,081 A | 5/1997 | Rybicki et al. | 395/348 |
| 5,638,508 A | 6/1997 | Kanai et al. | 714/20 |
| 5,640,577 A | 6/1997 | Scharmer | 395/765 |
| 5,647,002 A | 7/1997 | Brunson | 380/49 |
| 5,649,195 A | 7/1997 | Scott et al. | 395/617 |
| 5,666,553 A | 9/1997 | Crozier | 395/803 |
| 5,682,524 A | 10/1997 | Freund et al. | 395/605 |
| 5,684,990 A | 11/1997 | Boothby | 395/619 |
| 5,694,596 A | 12/1997 | Campbell | 395/610 |
| 5,699,255 A | 12/1997 | Ellis et al. | 701/212 |
| 5,701,423 A | 12/1997 | Crozier | 395/335 |
| 5,706,509 A | 1/1998 | Man-Hak Tso | 395/617 |
| 5,710,922 A | 1/1998 | Alley et al. | 395/617 |
| 5,727,202 A | 3/1998 | Kucala | 395/610 |
| 5,727,950 A | 3/1998 | Cook et al. | 434/350 |
| 5,729,735 A | 3/1998 | Meyering | 395/610 |
| 5,729,739 A | 3/1998 | Cantin et al. | 395/614 |
| 5,729,743 A | 3/1998 | Squibb | 395/619 |
| 5,742,792 A | 4/1998 | Yanai et al. | 395/489 |
| 5,745,750 A | 4/1998 | Porcaro | 707/102 |
| 5,745,906 A | 4/1998 | Squibb | 707/203 |
| 5,757,920 A | 5/1998 | Misra et al. | 380/25 |
| 5,758,150 A | 5/1998 | Bell et al. | 395/610 |
| 5,758,355 A * | 5/1998 | Buchanan | 707/201 |
| 5,764,899 A | 6/1998 | Eggleston et al. | 709/203 |
| 5,768,597 A | 6/1998 | Simm | 395/712 |
| 5,771,354 A | 6/1998 | Crawford | 395/200.59 |
| 5,778,346 A | 7/1998 | Frid-Nielsen et al. | 705/9 |
| 5,778,361 A | 7/1998 | Nanjo et al. | 707/500 |
| 5,778,367 A | 7/1998 | Wesinger et al. | 395/10 |
| 5,778,388 A | 7/1998 | Kawamura et al. | 707/203 |
| 5,781,901 A | 7/1998 | Kuzma | 707/10 |
| 5,787,247 A | 7/1998 | Norin et al. | 395/200.5 |
| 5,787,262 A | 7/1998 | Shakib et al. | 395/200.35 |
| 5,794,228 A | 8/1998 | French et al. | 707/2 |
| 5,804,803 A | 9/1998 | Cragun et al. | 235/375 |
| 5,809,497 A | 9/1998 | Freund et al. | 707/2 |
| 5,812,773 A | 9/1998 | Norin | 395/200.34 |
| 5,812,793 A | 9/1998 | Shakib et al. | 395/200.31 |
| 5,818,437 A | 10/1998 | Grover et al. | 345/811 |
| 5,826,245 A | 10/1998 | Sandberg-Diment | 705/44 |
| 5,832,489 A | 11/1998 | Kucala | 707/10 |
| 5,832,518 A | 11/1998 | Mastors | 707/202 |
| 5,832,519 A | 11/1998 | Bowen et al. | 707/203 |
| 5,845,283 A | 12/1998 | Williams et al. | 707/101 |
| 5,859,973 A | 1/1999 | Carpenter | 395/200.33 |
| 5,864,864 A | 1/1999 | Lerner | 707/102 |
| 5,875,296 A | 2/1999 | Shi et al. | 395/188.01 |
| 5,884,323 A | 3/1999 | Hawkins et al. | 707/201 |
| 5,884,325 A | 3/1999 | Bauer et al. | 707/201 |
| 5,893,119 A | 4/1999 | Squibb | 707/203 |
| 5,896,321 A | 4/1999 | Miller | 365/189.01 |
| 5,897,640 A | 4/1999 | Veghte et al. | 707/202 |
| 5,897,642 A | 4/1999 | Capossela et al. | 707/203 |
| 5,903,723 A | 5/1999 | Beck et al. | 709/203 |
| 5,907,793 A | 5/1999 | Reams | 455/3.1 |
| 5,923,756 A | 7/1999 | Shambroom | 713/156 |
| 5,923,848 A | 7/1999 | Goodhand et al. | 395/200.49 |
| 5,926,816 A | 7/1999 | Bauer et al. | 707/8 |
| 5,933,653 A | 8/1999 | Ofek | 395/826 |
| 5,933,816 A | 8/1999 | Zeanah et al. | 705/35 |
| 5,935,262 A | 8/1999 | Barrett et al. | 714/46 |
| 5,937,405 A | 8/1999 | Campbell | 707/10 |
| 5,941,944 A | 8/1999 | Messerly | 709/203 |
| 5,943,676 A | 8/1999 | Boothby | 707/201 |
| 5,944,787 A | 8/1999 | Zoken | 709/206 |
| 5,946,615 A | 8/1999 | Holmes et al. | 455/412 |
| 5,948,066 A | 9/1999 | Whalen et al. | 709/229 |
| 5,951,636 A | 9/1999 | Zerber | 709/202 |
| 5,961,572 A | 10/1999 | Craport et al. | 340/990 |
| 5,961,590 A | 10/1999 | Mendez et al. | 709/206 |
| 5,968,131 A | 10/1999 | Mendez et al. | 709/246 |
| 5,970,149 A | 10/1999 | Johnson | 714/46 |
| 5,970,490 A | 10/1999 | Morgenstern | 707/10 |
| 5,971,277 A | 10/1999 | Cragun et al. | 235/462.01 |
| 5,974,238 A | 10/1999 | Chase, Jr. | 395/200.78 |
| 5,974,563 A | 10/1999 | Beeler, Jr. | 714/5 |
| 5,987,381 A | 11/1999 | Oshizawa | 340/990 |
| 5,987,609 A | 11/1999 | Hasebe | 726/35 |
| 5,995,118 A | 11/1999 | Masuda | 345/467 |
| 6,000,000 A | 12/1999 | Hawkins et al. | 707/201 |
| 6,006,215 A | 12/1999 | Retallick | 707/2 |
| 6,006,274 A | 12/1999 | Hawkins et al. | 709/248 |
| 6,009,462 A | 12/1999 | Birrell et al. | 709/206 |
| 6,012,063 A | 1/2000 | Bodnar | 707/101 |
| 6,012,088 A | 1/2000 | Li et al. | 709/219 |
| 6,014,695 A | 1/2000 | Yamashita et al. | 709/219 |
| 6,016,394 A | 1/2000 | Walker | 717/104 |
| 6,016,478 A | 1/2000 | Zhang et al. | 705/9 |
| 6,023,708 A | 2/2000 | Mendez et al. | 707/203 |
| 6,023,723 A | 2/2000 | McCormick et al. | 709/206 |
| 6,026,414 A | 2/2000 | Anglin | 707/204 |
| 6,034,621 A | 3/2000 | Kaufman | 340/825.44 |
| 6,038,665 A | 3/2000 | Bolt et al. | 713/176 |
| 6,044,381 A | 3/2000 | Boothby et al. | 707/201 |
| 6,049,776 A | 4/2000 | Donnelly et al. | 705/8 |
| 6,052,735 A | 4/2000 | Ulrich et al. | 709/236 |
| 6,058,399 A | 5/2000 | Morag et al. | 707/201 |
| 6,061,790 A | 5/2000 | Bodnar | 713/171 |
| 6,061,796 A | 5/2000 | Chen et al. | 713/201 |
| 6,064,880 A | 5/2000 | Alanara | 455/419 |
| 6,065,018 A | 5/2000 | Beier et al. | 707/202 |
| 6,073,133 A | 6/2000 | Chrabaszcz | 707/10 |
| 6,076,109 A | 6/2000 | Kikinis | 709/228 |
| 6,078,960 A | 6/2000 | Ballard | 709/229 |
| 6,081,900 A | 6/2000 | Subramaniam et al. | 713/201 |
| 6,094,618 A | 7/2000 | Harada | 701/207 |
| 6,101,480 A | 8/2000 | Conmy et al. | 705/9 |
| 6,108,330 A | 8/2000 | Bhatia et al. | 370/352 |
| 6,108,703 A | 8/2000 | Leighton et al. | 709/226 |
| 6,131,096 A | 10/2000 | Ng et al. | 707/10 |
| 6,131,116 A | 10/2000 | Riggins et al. | 709/219 |
| 6,141,011 A | 10/2000 | Bodnar et al. | 345/357 |
| 6,141,621 A | 10/2000 | Piwowarski et al. | 340/989 |
| 6,141,659 A | 10/2000 | Barker et al. | 707/102 |
| 6,141,664 A | 10/2000 | Boothby | 707/201 |
| 6,148,260 A | 11/2000 | Musk et al. | 701/200 |
| 6,151,606 A | 11/2000 | Mendez | 707/201 |
| 6,157,630 A | 12/2000 | Adler et al. | 370/310 |
| 6,163,773 A * | 12/2000 | Kishi | 706/16 |
| 6,163,779 A | 12/2000 | Mantha et al. | 707/100 |
| 6,163,844 A | 12/2000 | Duncan et al. | 713/201 |
| 6,167,120 A | 12/2000 | Kikinis | 379/90.01 |
| 6,173,310 B1 | 1/2001 | Yost et al. | 709/201 |
| 6,173,311 B1 | 1/2001 | Hassett et al. | 709/202 |

| Patent No. | Date | Inventor | Class |
|---|---|---|---|
| 6,182,117 B1 | 1/2001 | Christie et al. | 709/205 |
| 6,182,141 B1 | 1/2001 | Blum et al. | 709/227 |
| 6,185,598 B1 | 2/2001 | Farber et al. | 709/200 |
| 6,189,030 B1 | 2/2001 | Kirsch et al. | 709/224 |
| 6,189,096 B1 | 2/2001 | Haverty | 713/155 |
| 6,195,695 B1 | 2/2001 | Cheston et al. | 709/221 |
| 6,195,794 B1 | 2/2001 | Buxton | 717/11 |
| 6,202,085 B1 | 3/2001 | Benson et al. | 709/205 |
| 6,205,448 B1 | 3/2001 | Kruglikov et al. | 707/200 |
| 6,212,529 B1 * | 4/2001 | Boothby et al. | 707/201 |
| 6,216,131 B1 | 4/2001 | Liu et al. | 707/102 |
| 6,219,680 B1 | 4/2001 | Bernardo et al. | 707/501 |
| 6,219,694 B1 | 4/2001 | Lazaridis et al. | 709/206 |
| 6,223,187 B1 | 4/2001 | Boothby et al. | 707/201 |
| 6,226,650 B1 | 5/2001 | Mahajan et al. | 707/201 |
| 6,233,565 B1 | 5/2001 | Lewis et al. | 705/35 |
| 6,233,589 B1 | 5/2001 | Balcha et al. | 707/203 |
| 6,243,760 B1 | 6/2001 | Armbruster et al. | 709/243 |
| 6,247,048 B1 | 6/2001 | Greer et al. | 709/219 |
| 6,247,135 B1 | 6/2001 | Feague | 713/400 |
| 6,252,547 B1 | 6/2001 | Perry et al. | 342/357.06 |
| 6,255,989 B1 | 7/2001 | Munson et al. | 342/357.13 |
| 6,256,750 B1 | 7/2001 | Takeda | 714/11 |
| 6,260,124 B1 | 7/2001 | Crockett et al. | 711/162 |
| 6,272,545 B1 | 8/2001 | Flanagin et al. | 709/228 |
| 6,275,831 B1 | 8/2001 | Bodnar et al. | 707/201 |
| 6,278,941 B1 | 8/2001 | Yokoyama | 701/209 |
| 6,282,435 B1 | 8/2001 | Wagner et al. | 455/566 |
| 6,282,698 B1 | 8/2001 | Baker et al. | 717/1 |
| 6,285,889 B1 | 9/2001 | Nykanen et al. | 455/557 |
| 6,286,029 B1 | 9/2001 | Delph | |
| 6,286,053 B1 | 9/2001 | Van Peursem et al. | 709/999.999 |
| 6,286,085 B1 | 9/2001 | Jouenne et al. | 711/162 |
| 6,292,743 B1 | 9/2001 | Pu et al. | 455/456 |
| 6,292,905 B1 | 9/2001 | Wallach et al. | 714/4 |
| 6,295,502 B1 | 9/2001 | Hancock et al. | 701/201 |
| 6,295,541 B1 * | 9/2001 | Bodnar et al. | 707/203 |
| 6,304,881 B1 | 10/2001 | Halim et al. | 707/201 |
| 6,317,755 B1 | 11/2001 | Rakers et al. | 707/204 |
| 6,321,236 B1 | 11/2001 | Zollinger et al. | 707/201 |
| 6,324,467 B1 | 11/2001 | Machii et al. | 701/200 |
| 6,324,526 B1 | 11/2001 | D'Agostino | 705/44 |
| 6,324,544 B1 | 11/2001 | Alam et al. | 707/201 |
| 6,327,533 B1 | 12/2001 | Chou | 340/988 |
| 6,329,680 B1 | 12/2001 | Yoshida et al. | 257/296 |
| 6,330,568 B1 | 12/2001 | Boothby et al. | 707/201 |
| 6,332,158 B1 | 12/2001 | Risley et al. | 709/219 |
| 6,333,973 B1 | 12/2001 | Smith et al. | 379/88.12 |
| 6,338,096 B1 | 1/2002 | Ukelson | 719/319 |
| 6,339,710 B1 | 1/2002 | Suzuki | 455/458 |
| 6,341,316 B1 | 1/2002 | Kloba et al. | 709/248 |
| 6,345,308 B1 * | 2/2002 | Abe | 709/248 |
| 6,349,336 B1 | 2/2002 | Sit et al. | |
| 6,353,448 B1 | 3/2002 | Scarborough et al. | 345/349 |
| 6,356,910 B1 | 3/2002 | Zellweger | 707/100 |
| 6,360,252 B1 * | 3/2002 | Rudy et al. | 709/206 |
| 6,360,330 B1 | 3/2002 | Mutalik et al. | 714/4 |
| 6,363,249 B1 | 3/2002 | Nordeman et al. | 455/418 |
| 6,363,412 B1 | 3/2002 | Niwa et al. | 709/203 |
| 6,374,250 B2 | 4/2002 | Ajtai et al. | 707/101 |
| 6,381,700 B1 | 4/2002 | Yoshida | 713/201 |
| 6,389,462 B1 | 5/2002 | Cohen et al. | 709/218 |
| 6,396,482 B1 | 5/2002 | Griffin et al. | 345/169 |
| 6,397,307 B2 | 5/2002 | Ohran | 711/161 |
| 6,397,351 B1 | 5/2002 | Miller et al. | 714/13 |
| 6,401,104 B1 | 6/2002 | LaRue et al. | 707/203 |
| 6,405,218 B1 | 6/2002 | Boothby | 707/201 |
| 6,418,309 B1 | 7/2002 | Moon et al. | 455/418 |
| 6,434,621 B1 | 8/2002 | Pezzillo et al. | 709/1 |
| 6,434,627 B1 | 8/2002 | Millet et al. | 709/245 |
| 6,437,818 B1 | 8/2002 | Ludwig et al. | 348/14.09 |
| 6,449,622 B1 | 9/2002 | LaRue et al. | 707/201 |
| 6,453,392 B1 | 9/2002 | Flynn, Jr. | 711/151 |
| 6,457,062 B1 | 9/2002 | Pivowar et al. | 709/248 |
| 6,460,036 B1 | 10/2002 | Herz | 707/10 |
| 6,463,464 B1 | 10/2002 | Lazaridis et al. | 709/207 |
| 6,466,967 B2 | 10/2002 | Landsman et al. | 709/203 |
| 6,473,621 B1 | 10/2002 | Heie | 455/466 |
| 6,480,896 B1 | 11/2002 | Brown et al. | 709/231 |
| 6,484,143 B1 | 11/2002 | Swildens et al. | 705/1 |
| 6,487,560 B1 | 11/2002 | LaRue et al. | 707/203 |
| 6,490,655 B1 * | 12/2002 | Kershaw | 711/133 |
| 6,496,944 B1 | 12/2002 | Hsiao et al. | 714/15 |
| 6,499,108 B1 | 12/2002 | Johnson | 713/201 |
| 6,507,891 B1 | 1/2003 | Challenger et al. | 711/122 |
| 6,516,327 B1 | 2/2003 | Zondervan et al. | 707/200 |
| 6,523,063 B1 | 2/2003 | Hanson et al. | 709/206 |
| 6,523,079 B2 | 2/2003 | Kikinis et al. | 710/303 |
| 6,535,743 B1 | 3/2003 | Kennedy et al. | 455/456.1 |
| 6,539,494 B1 | 3/2003 | Abramson et al. | 714/4 |
| 6,542,933 B1 | 4/2003 | Durst, Jr. et al. | 709/229 |
| 6,546,425 B1 | 4/2003 | Hanson et al. | 709/227 |
| 6,549,933 B1 | 4/2003 | Barrett et al. | 709/203 |
| 6,553,375 B1 | 4/2003 | Huang et al. | 707/10 |
| 6,553,410 B2 | 4/2003 | Kikinis | 709/218 |
| 6,553,413 B1 | 4/2003 | Leighton et al. | 709/219 |
| 6,567,850 B1 | 5/2003 | Freishtat et al. | 709/224 |
| 6,567,857 B1 | 5/2003 | Gupta et al. | |
| 6,581,065 B1 | 6/2003 | Rodkin et al. | 707/102 |
| 6,584,454 B1 | 6/2003 | Hummel et al. | 705/59 |
| 6,589,290 B1 | 7/2003 | Maxwell et al. | 707/507 |
| 6,591,266 B1 | 7/2003 | Li et al. | 707/10 |
| 6,591,306 B1 | 7/2003 | Redlich | 709/245 |
| 6,591,362 B1 | 7/2003 | Li | 713/1 |
| 6,597,700 B2 | 7/2003 | Golikeri et al. | 370/401 |
| 6,601,143 B1 * | 7/2003 | Lamparter | 711/134 |
| 6,609,005 B1 | 8/2003 | Chern | 455/457 |
| 6,636,894 B1 | 10/2003 | Short et al. | 709/225 |
| 6,640,302 B1 | 10/2003 | Subramaniam et al. | 713/169 |
| 6,643,707 B1 | 11/2003 | Booth | 709/245 |
| 6,654,746 B1 | 11/2003 | Wong et al. | 707/10 |
| 6,665,721 B1 | 12/2003 | Hind et al. | |
| 6,671,724 B1 | 12/2003 | Pandya et al. | 709/226 |
| 6,671,757 B1 * | 12/2003 | Muller et al. | 710/100 |
| 6,684,206 B2 | 1/2004 | Chen et al. | 706/61 |
| 6,684,302 B2 * | 1/2004 | Kershaw | 711/151 |
| 6,694,335 B1 | 2/2004 | Hopmann et al. | 707/200 |
| 6,694,336 B1 * | 2/2004 | Multer et al. | 707/201 |
| 6,701,316 B1 | 3/2004 | Li et al. | 707/10 |
| 6,704,849 B2 | 3/2004 | Steegmans | 711/162 |
| 6,714,987 B1 | 3/2004 | Amin et al. | 709/249 |
| 6,718,348 B1 | 4/2004 | Novak et al. | 707/201 |
| 6,718,390 B1 | 4/2004 | Still et al. | 709/229 |
| 6,725,239 B2 * | 4/2004 | Sherman et al. | 707/201 |
| 6,728,530 B1 | 4/2004 | Heinonen et al. | 455/414.1 |
| 6,732,101 B1 | 5/2004 | Cook | 707/10 |
| 6,732,264 B1 | 5/2004 | Sun et al. | 713/2 |
| 6,738,789 B2 | 5/2004 | Multer et al. | 707/201 |
| 6,741,851 B1 | 5/2004 | Lee et al. | |
| 6,745,040 B2 | 6/2004 | Zimmerman | 455/458 |
| 6,757,696 B2 | 6/2004 | Multer et al. | 707/201 |
| 6,757,698 B2 | 6/2004 | McBride et al. | 707/204 |
| 6,757,712 B1 | 6/2004 | Bastian et al. | 709/206 |
| 6,781,575 B1 | 8/2004 | Hawkins et al. | 345/173 |
| 6,795,848 B1 | 9/2004 | Border et al. | 709/213 |
| 6,799,214 B1 | 9/2004 | Li | 709/226 |
| 6,804,690 B1 | 10/2004 | Dysert et al. | 707/204 |
| 6,804,783 B1 | 10/2004 | Wesinger, Jr. et al. | 713/200 |
| 6,812,961 B1 | 11/2004 | Parulski et al. | 348/231.2 |
| 6,813,487 B1 | 11/2004 | Trommelen | |
| 6,816,481 B1 | 11/2004 | Adams et al. | 370/352 |
| 6,829,654 B1 | 12/2004 | Jungck | |
| 6,836,765 B1 | 12/2004 | Sussman | 705/41 |
| 6,839,568 B2 | 1/2005 | Suzuki | 455/550.1 |
| 6,842,695 B1 | 1/2005 | Tu et al. | 701/213 |

| Patent/Pub No. | Date | Inventor | Class |
|---|---|---|---|
| 6,850,944 B1 | 2/2005 | MacCall et al. | 707/100 |
| 6,868,451 B1 | 3/2005 | Peacock | 709/231 |
| 6,870,921 B1 | 3/2005 | Elsey et al. | 379/218.01 |
| 6,886,013 B1 | 4/2005 | Beranek | 707/10 |
| 6,892,225 B1 | 5/2005 | Tu et al. | 709/217 |
| 6,892,245 B1 | 5/2005 | Crump et al. | 709/245 |
| 6,904,460 B1 | 6/2005 | Raciborski et al. | 709/224 |
| 6,920,488 B1 | 7/2005 | Le Pennec et al. | 709/219 |
| 6,925,476 B1 | 8/2005 | Multer | 707/200 |
| 6,925,477 B1 | 8/2005 | Champagne et al. | 707/203 |
| 6,934,767 B1 | 8/2005 | Jellinek | 709/247 |
| 6,944,651 B2 | 9/2005 | Onyon et al. | 709/217 |
| 6,944,676 B1 | 9/2005 | Armbruster et al. | 709/243 |
| 6,954,783 B1 | 10/2005 | Bodwell et al. | 709/218 |
| 6,963,914 B1 | 11/2005 | Breitbart et al. | 709/226 |
| 6,996,631 B1 | 2/2006 | Aiken, Jr. et al. | 709/242 |
| 7,003,555 B1 | 2/2006 | Jungck | 709/219 |
| 7,003,668 B2 | 2/2006 | Berson et al. | 713/182 |
| 7,007,041 B2 | 2/2006 | Multer et al. | 707/201 |
| 7,010,578 B1 | 3/2006 | Lewin et al. | |
| 7,016,964 B1 | 3/2006 | Still et al. | |
| 7,023,868 B2 | 4/2006 | Rabenko et al. | 370/419 |
| 7,035,878 B1 | 4/2006 | Multer et al. | 707/201 |
| 7,039,656 B1 | 5/2006 | Tsai et al. | 707/201 |
| 7,051,275 B2 | 5/2006 | Gupta et al. | 715/512 |
| 7,054,594 B2 | 5/2006 | Bloch et al. | 455/41.2 |
| 7,054,952 B1 | 5/2006 | Schwerdtfeger et al. | |
| 7,085,817 B1 | 8/2006 | Tock et al. | |
| 7,096,418 B1 | 8/2006 | Singhal et al. | |
| 7,099,915 B1 | 8/2006 | Tenereillo et al. | |
| 7,103,794 B2 | 9/2006 | Malcolm et al. | |
| 7,116,681 B1 | 10/2006 | Hovell et al. | 370/466 |
| 7,162,494 B2 | 1/2007 | Arellano | 707/104.1 |
| 7,167,728 B1 | 1/2007 | Wagner et al. | 455/566 |
| 7,197,574 B1 | 3/2007 | Ishiyama | 709/245 |
| 7,233,791 B2 | 6/2007 | Gilbert et al. | 455/419 |
| 7,249,175 B1 | 7/2007 | Donaldson | 709/225 |
| 7,269,433 B2 | 9/2007 | Vargas et al. | 455/502 |
| 7,284,051 B1 | 10/2007 | Okano et al. | 709/226 |
| 7,289,964 B1 | 10/2007 | Bowman-Amuah | 705/1 |
| 7,293,074 B1 | 11/2007 | Jellinek et al. | 709/205 |
| 7,315,826 B1 | 1/2008 | Guheen et al. | 705/7 |
| 7,356,559 B1 | 4/2008 | Jacobs et al. | 709/203 |
| 7,363,233 B1 | 4/2008 | Levine | 705/1 |
| 7,392,034 B2 | 6/2008 | Westman et al. | 455/402 |
| 7,415,486 B2 | 8/2008 | Multer et al. | 709/201 |
| 7,447,743 B1 | 11/2008 | Jordan, Jr. | 709/206 |
| 7,454,500 B1 | 11/2008 | Hsu et al. | 709/226 |
| 7,499,888 B1 | 3/2009 | Tu et al. | 705/44 |
| 7,505,762 B2 | 3/2009 | Onyon et al. | 455/419 |
| 7,519,702 B1 | 4/2009 | Allan | |
| 2001/0014893 A1 | 8/2001 | Boothby | 707/201 |
| 2001/0044805 A1 | 11/2001 | Multer et al. | 707/201 |
| 2001/0047393 A1 | 11/2001 | Arner et al. | 709/216 |
| 2001/0047471 A1 | 11/2001 | Johnson | 713/1 |
| 2001/0051920 A1 | 12/2001 | Joao et al. | 705/41 |
| 2002/0007303 A1 | 1/2002 | Brokler et al. | 705/10 |
| 2002/0010868 A1 | 1/2002 | Nakashima et al. | 713/201 |
| 2002/0016818 A1 | 2/2002 | Kirani et al. | 709/206 |
| 2002/0016912 A1 | 2/2002 | Johnson | 713/165 |
| 2002/0032751 A1 | 3/2002 | Bharadwaj | 709/218 |
| 2002/0040369 A1 | 4/2002 | Multer et al. | 707/200 |
| 2002/0049852 A1 | 4/2002 | Lee et al. | 709/231 |
| 2002/0055909 A1 | 5/2002 | Fung et al. | 705/42 |
| 2002/0056011 A1 | 5/2002 | Nardone et al. | 709/248 |
| 2002/0059116 A1 | 5/2002 | Bulatovic et al. | 705/27 |
| 2002/0062365 A1 | 5/2002 | Nishikawa et al. | 709/223 |
| 2002/0073212 A1 | 6/2002 | Sokol et al. | 709/229 |
| 2002/0078075 A1* | 6/2002 | Colson et al. | 707/204 |
| 2002/0082995 A1 | 6/2002 | Christie | 705/44 |
| 2002/0083325 A1 | 6/2002 | Mediratta et al. | 713/191 |
| 2002/0091785 A1 | 7/2002 | Ohlenbusch et al. | 709/208 |
| 2002/0116444 A1 | 8/2002 | Chaudhri et al. | 709/201 |
| 2002/0120600 A1 | 8/2002 | Schiavone et al. | 707/1 |
| 2002/0128908 A1 | 9/2002 | Levin et al. | 705/14 |
| 2002/0138582 A1 | 9/2002 | Chandra et al. | 709/206 |
| 2002/0138765 A1 | 9/2002 | Fishman et al. | 713/201 |
| 2002/0162011 A1 | 10/2002 | Tanaka et al. | 713/200 |
| 2003/0028451 A1 | 2/2003 | Ananian | 705/27 |
| 2003/0028554 A1* | 2/2003 | Koskimies et al. | 707/201 |
| 2003/0037020 A1 | 2/2003 | Novak et al. | 707/1 |
| 2003/0061163 A1 | 3/2003 | Durfield | 705/44 |
| 2003/0065934 A1 | 4/2003 | Angelo et al. | 713/200 |
| 2003/0069874 A1 | 4/2003 | Hertzog et al. | 707/1 |
| 2003/0084121 A1 | 5/2003 | De Boor et al. | 709/218 |
| 2003/0134625 A1 | 7/2003 | Choi | 455/418 |
| 2003/0135463 A1 | 7/2003 | Brown et al. | 705/44 |
| 2003/0139172 A1 | 7/2003 | Lampela et al. | 455/415 |
| 2003/0204568 A1 | 10/2003 | Bhargava et al. | 709/206 |
| 2003/0208546 A1 | 11/2003 | Desalvo et al. | 709/206 |
| 2003/0224760 A1 | 12/2003 | Day | 455/412.1 |
| 2003/0229898 A1 | 12/2003 | Babu et al. | 725/87 |
| 2003/0233383 A1* | 12/2003 | Koskimies | 707/204 |
| 2004/0054746 A1 | 3/2004 | Shibata | 709/207 |
| 2004/0093317 A1 | 5/2004 | Swan | 707/10 |
| 2004/0093342 A1 | 5/2004 | Arbo et al. | 707/102 |
| 2004/0093385 A1 | 5/2004 | Yamagata | 709/206 |
| 2004/0111465 A1 | 6/2004 | Chuang et al. | 709/203 |
| 2004/0132428 A1 | 7/2004 | Mulligan | 455/411 |
| 2004/0142711 A1* | 7/2004 | Mahonen et al. | 455/502 |
| 2004/0162830 A1 | 8/2004 | Shirwadkar et al. | 707/10 |
| 2004/0192260 A1 | 9/2004 | Sugimoto et al. | 455/419 |
| 2004/0192282 A1 | 9/2004 | Vasudevan | 455/412.1 |
| 2004/0193953 A1 | 9/2004 | Callahan et al. | 714/15 |
| 2004/0204120 A1 | 10/2004 | Jiles | |
| 2004/0224665 A1 | 11/2004 | Kokubo | 455/411 |
| 2004/0235523 A1 | 11/2004 | Schrire et al. | 455/558 |
| 2004/0267944 A1 | 12/2004 | Britt | 709/229 |
| 2005/0021571 A1 | 1/2005 | East | 707/101 |
| 2005/0032527 A1* | 2/2005 | Sheha et al. | 455/456.1 |
| 2005/0038863 A1 | 2/2005 | Onyon et al. | 709/206 |
| 2005/0044404 A1 | 2/2005 | Bhansali et al. | 713/200 |
| 2005/0060392 A1* | 3/2005 | Goring et al. | 709/220 |
| 2005/0064859 A1 | 3/2005 | Kotzin et al. | 455/419 |
| 2005/0086296 A1 | 4/2005 | Chi et al. | 709/203 |
| 2005/0086318 A1* | 4/2005 | Aubault | 709/213 |
| 2005/0090253 A1 | 4/2005 | Kim et al. | 455/435.1 |
| 2005/0099963 A1 | 5/2005 | Multer et al. | 707/10 |
| 2005/0100150 A1 | 5/2005 | Dhara et al. | 379/142.01 |
| 2005/0102257 A1 | 5/2005 | Onyon et al. | 709/206 |
| 2005/0102328 A1 | 5/2005 | Ring et al. | 707/204 |
| 2005/0131990 A1 | 6/2005 | Jewell | 709/201 |
| 2005/0203971 A1* | 9/2005 | Koskimies et al. | 707/203 |
| 2005/0204001 A1* | 9/2005 | Stein et al. | 709/206 |
| 2005/0210101 A1* | 9/2005 | Janik | 709/203 |
| 2006/0021059 A1 | 1/2006 | Brown et al. | 455/410 |
| 2006/0035647 A1 | 2/2006 | Eisner et al. | 455/456.1 |
| 2006/0052091 A1 | 3/2006 | Onyon et al. | 455/415 |
| 2006/0190626 A1 | 8/2006 | Bhogal et al. | 709/248 |
| 2007/0050734 A1 | 3/2007 | Busey | 715/853 |
| 2007/0053335 A1 | 3/2007 | Onyon et al. | 370/343 |
| 2007/0056043 A1 | 3/2007 | Onyon et al. | 713/189 |
| 2007/0061331 A1 | 3/2007 | Ramer et al. | 707/10 |
| 2007/0082668 A1 | 4/2007 | Silver et al. | 455/432.3 |
| 2007/0094042 A1 | 4/2007 | Ramer et al. | 705/1 |
| 2007/0226272 A1 | 9/2007 | Huang et al. | 707/201 |
| 2008/0022220 A1 | 1/2008 | Cheah | 715/769 |
| 2008/0039020 A1 | 2/2008 | Eskin | 455/41.2 |
| 2008/0082421 A1 | 4/2008 | Onyon et al. | 705/14 |
| 2008/0201362 A1 | 8/2008 | Multer et al. | 707/103 R |
| 2008/0214163 A1 | 9/2008 | Onyon et al. | 455/414.2 |
| 2009/0055464 A1 | 2/2009 | Multer et al. | 709/201 |

| | | |
|---|---|---|
| 2009/0106110 A1 | 4/2009 | Stannard et al. ............. 455/419 |

FOREIGN PATENT DOCUMENTS

| | | |
|---|---|---|
| CN | 1202662 | 12/1998 |
| CN | 1455522 | 11/2003 |
| CN | 1313697 A | 2/2005 |
| CN | 2003-122958 | 7/2006 |
| EP | 0801487 A2 | 10/1997 |
| EP | 0836131 A2 | 4/1998 |
| EP | 0836301 A | 4/1998 |
| EP | 0924917 A2 | 6/1999 |
| EP | 0930593 A | 7/1999 |
| EP | 1024441 A2 | 2/2000 |
| EP | 0986225 A1 | 3/2000 |
| EP | 1139608 A2 | 10/2001 |
| EP | 1180890 A2 | 2/2002 |
| EP | 1263244 A2 | 4/2002 |
| GB | 2366050 A | 6/2001 |
| JP | 10191453 | 7/1998 |
| JP | 11242620 | 9/1999 |
| JP | 11242677 | 9/1999 |
| WO | WO 97/04391 | 2/1997 |
| WO | WO 97/39564 | 10/1997 |
| WO | WO 97/41520 | 11/1997 |
| WO | WO 98/03005 | 1/1998 |
| WO | WO 98/21648 | 5/1998 |
| WO | WO 98/29994 A | 7/1998 |
| WO | WO 98/54662 | 12/1998 |
| WO | WO 98/56159 A | 12/1998 |
| WO | WO 99/05813 | 2/1999 |
| WO | WO 99/06900 | 2/1999 |
| WO | WO 99/36870 | 7/1999 |
| WO | WO 99/40514 | 8/1999 |
| WO | WO 99/45451 | 9/1999 |
| WO | WO 99/45484 | 9/1999 |
| WO | WO 99/46701 A | 9/1999 |
| WO | WO 99/50761 | 10/1999 |
| WO | WO 99/65256 | 12/1999 |
| WO | WO 00/11832 | 3/2000 |
| WO | WO 00/16222 | 3/2000 |
| WO | WO 00/29998 | 5/2000 |
| WO | WO 01/71539 | 9/2001 |
| WO | WO 01/80535 A1 | 9/2001 |
| WO | WO 2005/112586 A2 | 12/2005 |

OTHER PUBLICATIONS

BusinessWire "FusionOne Partners with WhitePages.com to Deliver Automatic Synchronization for Online Subscribers", press release, Oct. 11, 2000.*

Jennings, J. "SyncML DM: A SyncML Protocol for Device Management", slide presentation, downloaded from www.openalliance.org/tech/affiliates/syncml/syncmldm_28jan02_james_jennings.pdf, Jan. 28, 2002.*

Toroi, T. "The SyncML Road Ahead—Application Development and Device Management", slide presentation, downloaded from www.openalliance.org/tech/affiliates/syncml/syncmldm_30jan02_teemu_toroi.pdf, Jan. 30, 2002.*

BusinessWire "FusionOne Unveils Integrated Carrier Product Suite to Deliver Mobility Solutions to Individuals and the Enterprise", press release, Mar. 18, 2002.*

Pabla, C. "SyncML Intensive", downloaded from www-128.ibm.com/developerworks/wireless/library/we-syncml2, Apr. 1, 2002.*

BusinessWire "SyncML Announces 18 New Compliant Products, SyncML DM Engineering Event Hald; 99 Devices Now Certified SyncML Compliant", press release, Sep. 25, 2002.*

FusionOne "FusionOne Unveils MightyPhone™ Wireless Service", press release, Nov. 18, 2002.*

Sheha, M.A. et al. "Specification and Drawings of U.U. U.S. Appl. No. 60/493,704", filed Aug. 8, 2003.*

Finnigan, Anne, "The Safe Way to Shop Online," Sep. 1998, p. 162, Good Housekeeping, v. 227 No. 3.

Chase, Larry, "Taking Transactions Online," Oct. 1998, pp. 124-132, Target Marketing, v.21 No. 10.

Gong, Li, "Increasing Availability and Security of an Authentication Service," Jun. 1993, pp. 657-662, IEEE Journal on Selected Areas in Communications, v. 11 No. 5.

DeMaio, Harry B., "My MIPS Are Sealed," Sep./Oct. 1993, pp. 46-51, Chief Information Officer Journal, v. 5 issue 7.

Anonymous: "Download filter for MMS", Research Disclosure, Mason Publications, Hampshire, GB, vol. 457, No. 28, May 1, 2002, XP007130322, ISSN: 0374-4353.

Intellisync Email Accelerator, A detailed guide to functionality-Product functionality paper, Mar. 2004, pp. 1-18.

Lee et al, "Monitoring Data Archives for Grid Environments," Jul. 2002, 10 pgs.

Batista et al. "Mining Web Access Logs of an On-line Newspaper" Jul. 2002, 8 pgs http://ectrl.itc.it/rpec/.

Internet Mail Consortium: :vCard Overview, Oct. 13, 1998, 3 pages, Retrieved from the Internet: www.imc.org/pdi/vcardoverview.

Internet Mail Consortium: :vCard The Electronic Business Card, Jan. 1, 1997, 5 pages, Retrieved from the Internet: www.imc.org/pdi/vcardwhite.html.

Reed, Benjamin C., et al.,"Authenticating Network-Attached Storage,"IEEE, Jan.-Feb.2000, pp. 49-57.

Malone, et al., Semi-Structured Messages are Surprisingly Useful for Computer-Supported Coordination, Proceedings of the Conference on Computer-Supported Cooperative Work, Austin, Texas, Dec. 3-5, 1986, pp. 1-26.

Patel et al.,"The Multimedia Fax-MIME Gateway," 8440 IEEE MultiMedia No. 4, Jan. 1994, 7 pgs.

Lamb et al.,"LAN-Based Office for the Enterprise, A Case Study," Advantis Company, White Plains, NY 10605, Jan. 1994 IEEE, pp. 440-447.

Starfish, "TrueSync Data Synchronization," Software, http://www.starfishsoftware.com/solutions/data/data.html, Jan. 2003.

* cited by examiner

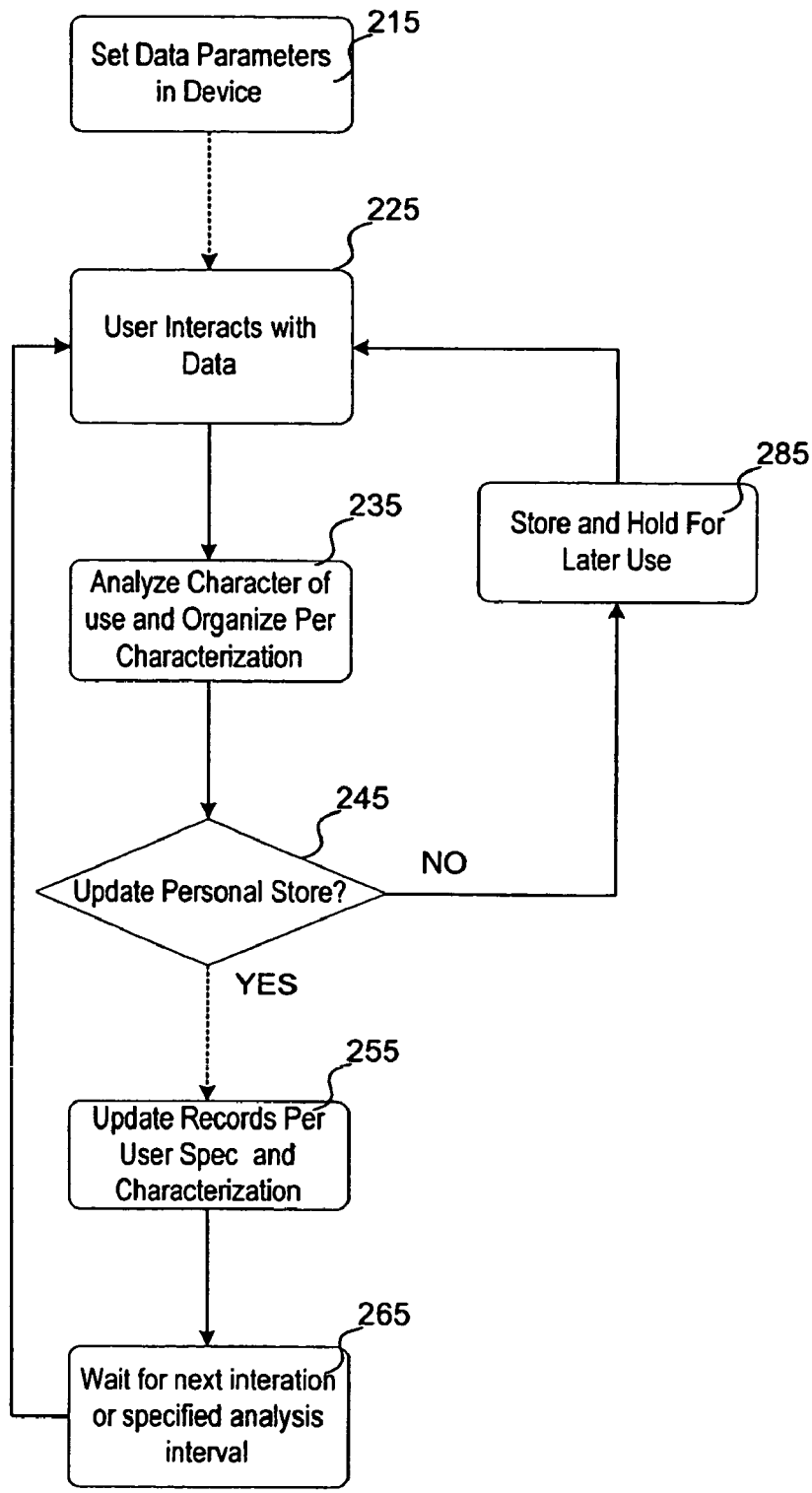

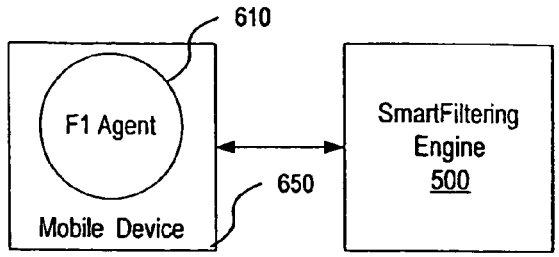
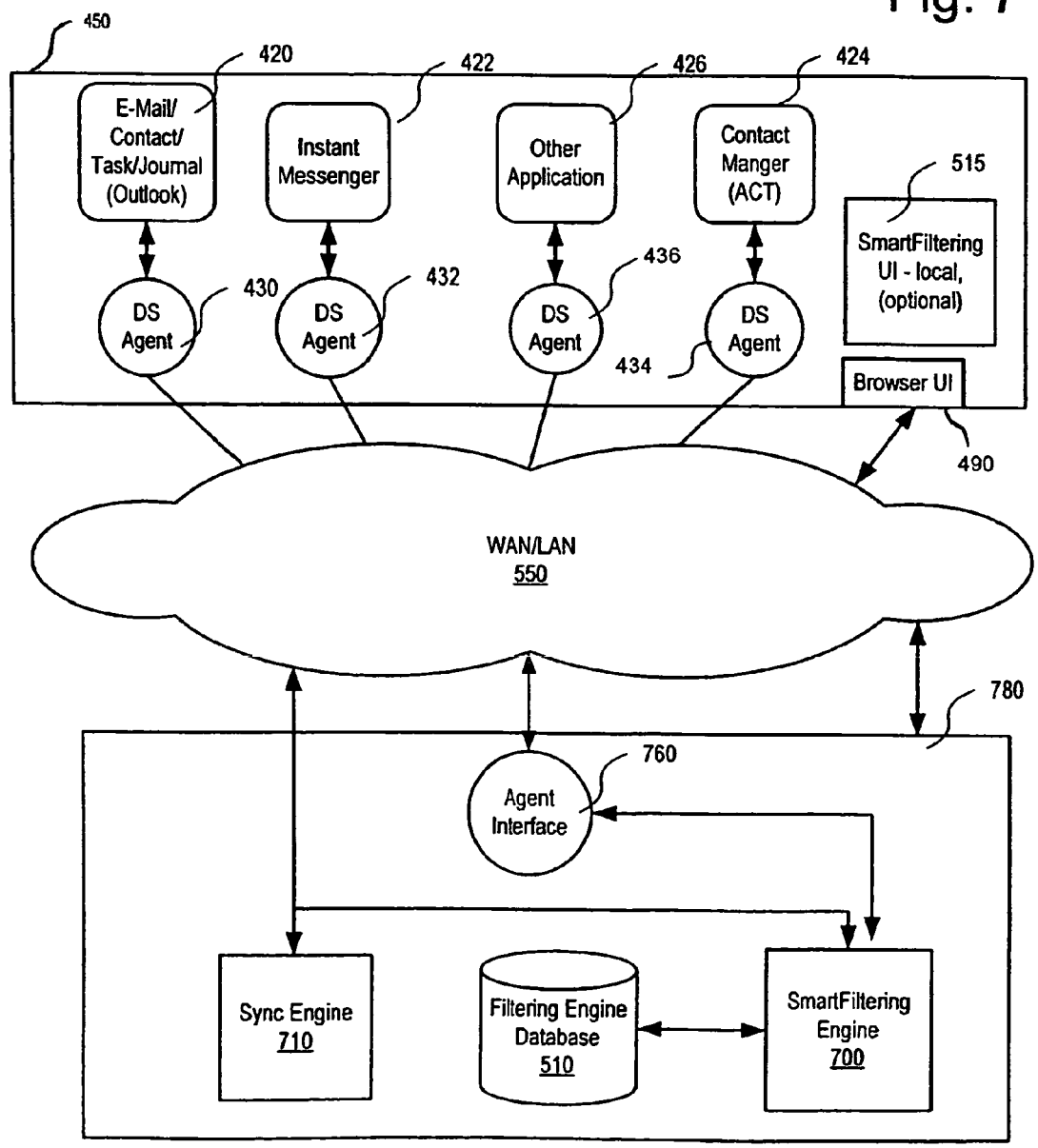

PERSONAL INFORMATION SPACE MANAGEMENT SYSTEM AND METHOD

BACKGROUND OF THE INVENTION

1. Field of the Invention

The present invention is directed to controlling and managing personal information, and in particular, to managing personal information in an individual user's personal information space.

2. Description of the Related Art

People increasingly manage their personal information through electronic means, such as personal digital assistants, on-line contact and calendar applications and even wireless phones. Hence, a migration of contact, document, financial, and other personal information has been made away from paper calendars, address books and records toward electronic systems. Both the type and the quantity of personal information in electronic form are growing.

Personal Information Managers (PIMs) generally comprise software applications running on a processing device such as a computer and personal digital assistants (PDAs). PDA's are small, electronic devices of varying types, which store reminder, contact, task, notes, and text information as well as other types of files. In the desire to increase the manageability of personal information, PIMS and PDA's have merged with cellular telephones, PIMs have migrated into online contact managers and pocket personal computers have become more and more powerful.

Generally, software PIMs include products such as Microsoft Outlook, Interactive Commerce Corporation's ACT!, and other similar programs are designed to run on a computer. PDA devices include devices such as those using the Palm® or Microsoft Windows Pocket PC operating systems, as well as other, more basic contact and calendar devices. Each PDA generally includes calendar, contact, personal tasks, notes, documents, and other information, while more sophisticated devices allow a user to fax, send e-mails, and communicate from within the application over a physical or wireless network. Even advanced cellular phones carry enough memory and processing power to store contact information, surf the web, and provide text messaging. Along with the growth in the sophistication of these devices, the need to transfer information between them has grown significantly as well.

Online personal information managers make access to data from any networked terminal possible. Many Internet web portals also now provide file storage, contact and calendar services. For example, major service portals such as Yahoo!, Excite, Lycos, MSN and others provide on-line calendar and contact manager services via a web browser to registered users. This allows a user to log in to their own calendar and address book from any Internet-capable web browsing application since the user's individual data is stored on a host server maintained by the web portal provider. Each of these services includes a data store as well.

All such personal information operated on and stored by a user can be considered within that user's "personal information space." In this context, a "personal information space" is a data store of information customized by, and on behalf of the user which contains both public data the user puts into their personal space, private events in the space, and other data objects such as text files or data files which belong to the user and are manipulated by the user. The personal information space is defined by the content which is specific to and controlled by an individual user, generally entered by or under the control of the individual user, and which includes "public" events and data, those generally known to others, and "private" events and data which are not intended to be shared with others. It should be recognized that each of the aforementioned criteria is not exclusive or required, but defines characteristics of the term "personal information space" as that term is used herein. In this context, such information includes electronic files such as databases, text files, word processing files, and other application specific files, as well as contact information in personal information managers, PDAs and cellular phones.

Once a personal information space is defined, the challenge becomes managing information in the space particularly between different devices. For example, if an individual keeps a calendar of information on a personal computer in his or her office using a particular personal information manager application, the individual would generally like to have the same information available in a cellular phone, hand-held organizer, and perhaps a home personal computer. The individual may additionally need some characterization of the information, such as what information is more relevant or important to have in a particular location, and which people the user interacts with regularly, and how the user interacts with them.

Mechanisms exist for moving data between a number of devices and keeping a user's personal information on those devices current between all the devices.

Co-pending application Ser. Nos. 09/490,550, 09/491,675 and 09/491,694 disclose a novel method and system for synchronization of personal information including that which is conventionally found in desktop applications, personal digital assistants, palm computers, and website calendar services, as well as any content in the personal information space including file systems, contact information and/or calendaring information. Such systems can keep information on different systems in sync, but no qualitative method for evaluating the importance of the information to a user is provided.

Hence, a system whereby a user can automate the process of determining the importance of personal information on one or more of the user's devices based on characteristics of the user's interactions with such information would be useful.

SUMMARY OF THE INVENTION

The invention, in one aspect, comprises a system for organizing information in a personal information space. The personal information space includes at least one data source holding at least a portion of the personal information space. The system includes an agent for the data source which provides interaction information regarding data in the data source; and a interaction evaluation engine including one or more weighting characteristics for each interaction, and providing an output reflecting a weighting of one or more characteristics of the interaction.

In a further aspect, the invention is a method for managing a user's personal contact information from a variety of contact data sources, each data source comprising a device or application storing contact information used by the user. In this embodiment, the method may comprise the steps of determining when an interaction between a contact on one of the contact data sources occurs; analyzing one or more characteristics of the interaction event to determine a at least one trait about the interaction; and generating a result based on said step of analyzing.

In yet another aspect, the invention comprises one or more processor readable storage devices having processor readable code embodied on said processor readable storage devices, said processor readable code for programming one or more processors to perform a method. In such aspect, the method may comprise the steps of: determining when an interaction between a contact on one of the contact data sources occurs; analyzing one or more characteristics of the interaction event to determine a at least one trait about the interaction; and generating a result based on said step of analyzing.

In a still further aspect, the invention comprises a contact management method. In this aspect, the method may comprise the steps of determining interactions between a user and the user's contacts via at least one communication means; analyzing one or more characteristics of the interaction to determine at least one trait about the interaction; rating contacts based on the trait; and updating the user's contact information based on said ranking.

In another aspect, the invention is a system for managing a user's personal information. The system may include means for monitoring data interaction by a device or application on a per-user basis; means for evaluating the interaction based on one or more characteristics of the interaction; and means for weighing elements of the data based on said step of evaluating.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers. These and other objects and advantages of the present invention will appear more clearly from the following description in which the preferred embodiment of the invention has been set forth in conjunction with the drawings.

BRIEF DESCRIPTION OF THE DRAWINGS

The invention will be described with respect to the particular embodiments thereof. Other objects, features, and advantages of the invention will become apparent with reference to the specification and drawings in which:

FIG. 2B is a flowchart illustrating a second embodiment of a method in accordance with the present invention.

FIG. 6 is a diagram illustrating an embedded embodiment of the present invention.

FIG. 7 is a diagram showing functional components of a third embodiment of the present invention.

DETAILED DESCRIPTION

The system and method of the present invention provide a means for a user to automatically sort and prioritize information belonging in the user's personal information space. In general, the term "smart-filtering" is used to describe the system and method which aid the user in managing personal information. However, such term should not be construed as limiting the invention to a "filter." The invention includes mechanisms to characterize information without limiting, rejecting or altering data under consideration. In a basic embodiment, the system analyzes a user's interaction with the user's contact records, and updates devices containing those records to hold only those records used the most, or chosen by the user to be held. In more complex embodiments, the system can analyze a user's interaction with any type of data in the personal information space, and make judgments about the data based on the user's interaction with the data. The system then allows the user to manipulate the data based on this analysis in any number of ways.

Figure 1:
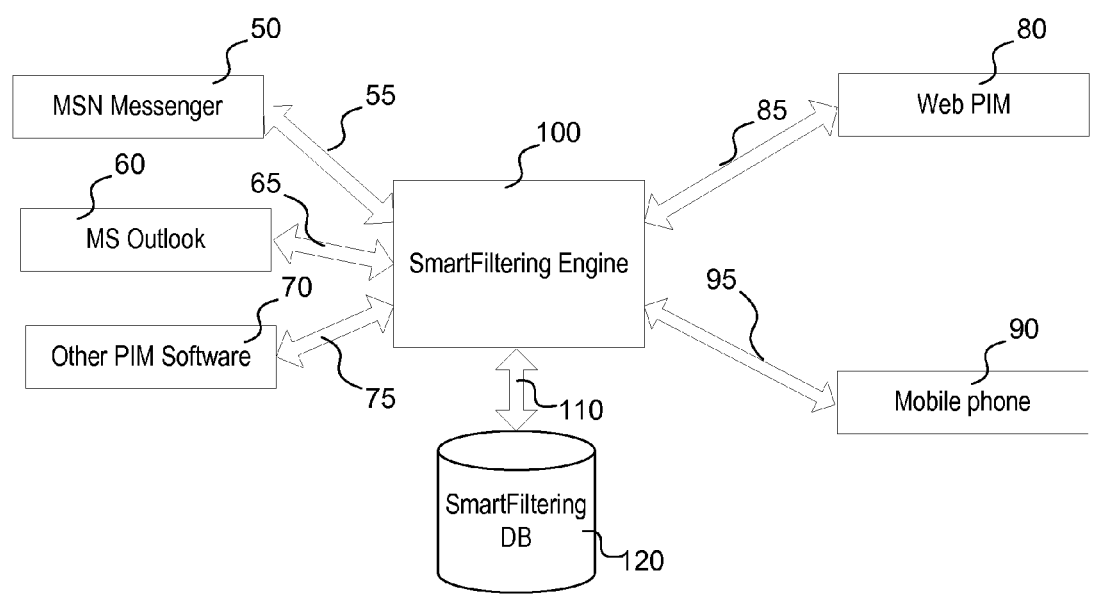
FIG. 1 is a block diagram of a first hardware system for implementing the present invention.

FIG. 1 shows a block diagram overview of a system for implementing the present invention. Shown in FIG. 1 are a smart filtering engine 100 and a smart filtering database 120. Arrow 110 represents two-way communication between smart filtering engine 100 and smart filtering database 120. Engine 100 and database 120 may be provided on individual processing devices such as those disclosed in FIG. 3, or may be provided on a single combined device. A number of applications 50, 60, 70, 80, and 90 communicate with the smart filtering engine via communication channels 55, 65, 75, 85, and 95. Communication channels 55, 65, 75, 85, and 95, may be network communications, wireline communications, wireless communications, or any means of communicating data in analog or binary format between the applications and the smart filtering engine. As will be explained herein, applications may include any application which contains data in a user's personal information space. Examples include instant messaging applications such as MSN Messenger 50, e-mail applications, contact manager applications, and consolidated email and contact applications such as Microsoft Outlook 60, other personal information manager software 70, a web personal information manager 80, and a mobile telephone 90.

Each of the applications contains a data store which includes information relative to the particular application. For example, MS Outlook will have associated with it a data store, such as a Microsoft Exchange database or a personal settings file associated with a particular user which stores information in that user's personal information space, such as e-mail, contact, journal, task, and other information. Mobile phone 90 will have, for example, a built-in memory for storing a number of telephone numbers and other contact information.

In accordance with the present invention, the smart filtering engine extracts information from each of the data stores associated with the applications 50, 60, 70, 80, and 90, and assesses the data to determine its importance to the user based on one or more characteristics of the data, and returns an output to the user. One simple example is to rank contact information based on the frequency of use of the information by the user. The engine may comprise code operable on a processing device for implementing this method. In accordance with the method, engine 100 may communicate with database 120 to store certain elements of the information from the applications in order to utilize this information in the analysis of the importance of the data to process it in accordance with the present invention.

In one embodiment of the present invention, the database 120 need not be a physically separate database, but represents a logical database. For example, in one embodiment, the engine may associate data characteristics with individual data records in each application's own data store, by using custom fields or additional records in the application's data store. All equivalent methods of associating data needed to perform the methods of the present invention with user personal information are contemplated as being within the scope of the present invention.

Figure 2A:
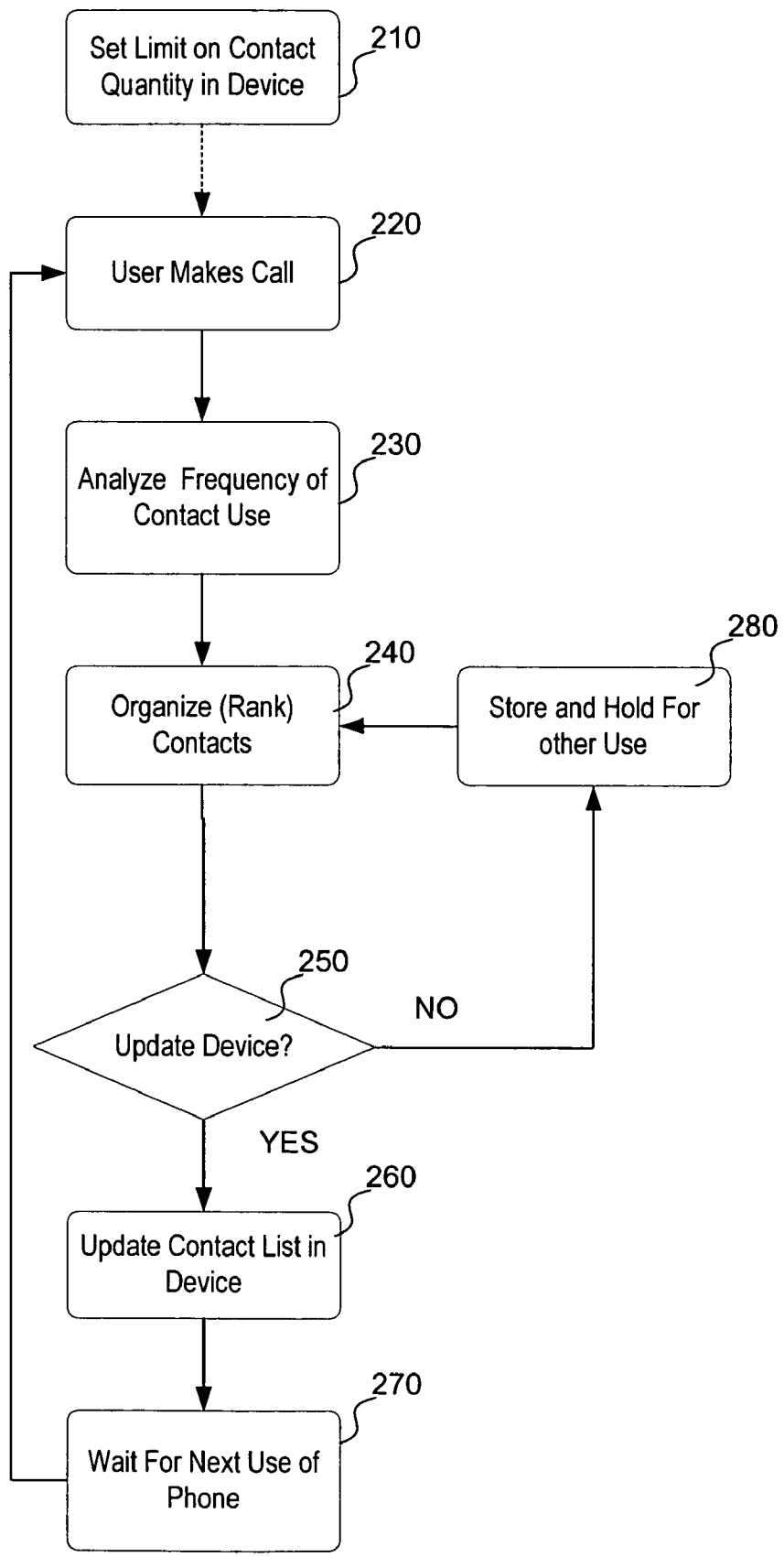
FIG. 2A is a flowchart illustrating one embodiment of a method in accordance with the present invention.

FIG. 2a shows a first, simple embodiment of a method of the present invention. In one context, the method of the present invention may be optimally utilized to extract contact information from, for example, a mobile phone, based on the frequency of usage that a user uses that contact information, and populate the phone or other devices with the more frequently used contacts. In the more general embodiment, described with respect to FIG. 2b the method of the present invention involves analyzing any type of information in a user's personal information space and returning the relative importance of the information based on any number of characteristics of the data. Such characteristics may include frequency of use, the character of use, the nature of the use, who the use is interacted with, and any number of other factors listed herein.

In the embodiment of FIG. 2a, the invention is described in the context of analyzing data for updating a telephone address book. As shown in FIG. 2a, a first step 210 involves setting a limit on the number of contacts that user wishes to have input into the device. The step 210 may comprise a limit which is set by the user, or may comprise a physical limit of memory spaces in the telephone. While more recent models of cellular telephones include hundreds of spaces for contact information, a user may not want to populate all of this information space, the user may have contacts which exceed the number of spaces allowed in the phone, or the number of contacts in the phone may be limited by the user not wishing to include more than a certain number of contacts in the phone. The dashed arrow between step 210 and step 220 indicates that the limitation step 210 is an optional step in accordance with the present invention.

At step 220, the user interacts with a contact by making a call using an entry from the phone book. Most cellular phones track recent call information and identify if such information is for a user in the phone's address book. At step 230, the use of the contact is noted, and at step 240, all contacts under analysis are ranked according to their frequency of use. A simplistic organization might be ranking the contacts in the order of the frequency that they are contacted by the user. In a cellular phone embodiment, this may involve simply analyzing the number of times a user telephones a particular contact in his address book and using the frequency analysis to rank the contact relative to other contacts. In this manner, if the user has, for example 700 contacts, the system will analyze and rank the contacts, and the user may then use that information as needed. For example, the user could instruct the system to update the user's phone with the most frequently called 100 contacts. The frequency of use and ranking may be stored in the smart filtering database at step 280 whether or not the user chooses to update the user's phone. If the user chooses to update the phone at step 250, the contact list in the device is updated at step 260. The storage step 280 may be performed whether or not the device is updated.

The method then waits for the next use of the phone (or "data interaction") at step 270.

Each use of the phone with the contact information therein comprises an interaction with the data. It should be understood that uses of the phone can include not only making a call using the number from the phone's internal phone book, but also adding, deleting and modifying entries in the phone book, receiving a call, or using the contact information to send an email or text message from the phone. Hence, in the context of this invention, an interaction with data in a user's personal information space is any use of the personal information space data by the user to any degree.

FIG. 2b shows a more generalized embodiment of the system of the present invention. In FIG. 2b, any type of personal information space data maybe analyzed. Initially, at step 215, data parameters (such as, for example, phone book limits or other parameters) may be set by the user or by the physical limitations of the device. The dashed line between step 215 and 225 indicates that the limitation step 215 is optional.

At step 225, a user interacts with the data in some form. Examples of such interaction might include using a contact for telephone or email or messenger communications, using a messenger application to contact a "buddy" (thereby interacting with the buddy data entry), modifying a data file, such as a word processing file or spreadsheet file, accessing a database file, or any number of tasks and interactions that a user makes with data in the user's personal information space.

At step 235, data from an application is analyzed based on one or more rating factors. One such factor may be frequency, as described with respect to FIG. 2a. The nature and number of such factors may depend on the type of information analyzed. For example, if the data is contact information, the type of analysis which may occur can be the frequency of the use, the amount of use (in terms of the length of time one communicates with the contact), a weighting of the use (based on any number of a combination of factors), the length of time between interactions with the contact, the duration of the contact, the type of interaction with the contact, or other types of interactions. After analyzing the character of the use at step 235, the data is organized based on one or more of the characteristics available to the filtering engine 100 at step 235. One example of such organization is ranking the contacts. Other examples of organizing the contacts may include filtering based on the type of contact, the source of the contact (such as, for example, all users at one domain or physical address), or other user-defined filtering criteria.

The implementation with respect to a cell phone and contacts is described with respect to FIG. 2a. Other examples include: updating a frequently used file list to enable files to be synchronized to one or more devices; updating a buddy list in an instant messenger application; updating database records frequently used, and the like.

At step 245, an update step for the user's personal information store may be implemented. This update step may include updating any number of device databases, or a separate database, such as the smart filtering database (described below), with the characteristic analysis of the user's personal information analyzed in step 235. For example, if a user wishes to populate the user's telephone with 100 of the most frequently used contact, the user can allow his phone to be updated at step 255. Other examples include updating a frequently used file list, or updating other lists maintained by applications which track the use of information in the personal information space by the user.

If the device is not to be updated, at step 285, the information may be stored in smart filtering database 120 for future use in analysis step 235. If the device is to be updated, at step 255 or prior thereto, the user may elect or have elected to mark certain records or data to manually determine what happens during the update step 255. For example, the user may wish to designate certain records as never to be included in the phone, or always to be included in the phone. If the update step is for a phone, at step 255, the present invention must check the contact record associated with the data from the application to ensure that the user has not manually selected one of a number of options with respect to the data. If the user has indicated that one or more records should "never" or "always" be contained in the data store, then at step 255, the records are updated according to the user preference first and the characterization by the system second. If any record can be updated, then at step 255, the contact list in the device is updated with all records available. At step 265, the system then waits for the next analysis point, which may be each individual interaction with the user data from an application, or an analysis based on a timed interaction whereby the system waits a specific amount of time to reexamine the user's contact or application data usage before reanalyzing the data.

Figure 3:
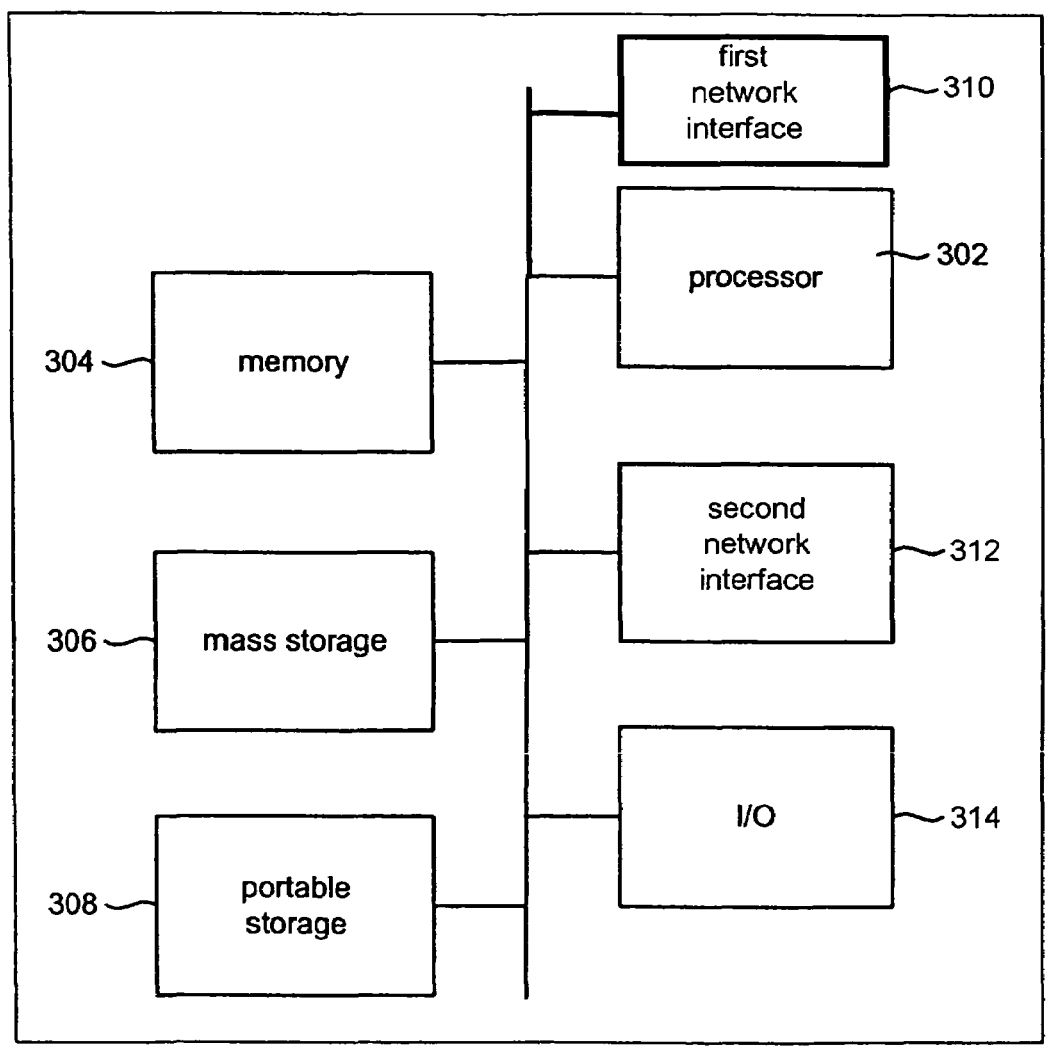
FIG. 3 is a block diagram of a processing device suitable for implementing software to perform the method of the present invention.

FIG. 3 shows one example of a hardware architecture for computers used to implement the present invention. The hardware includes a processor 302, a memory 304, a mass storage device 306, a portable storage device 308, a first network interface 310, a second network interface 312 and I/O devices 314. The choice of processor is not critical as long as a suitable processor with sufficient speed is chosen. Memory 304 can be any conventional computer memory. Mass storage device 306 can include a hard drive, CD-ROM or any other mass storage device. Portable storage 308 can include a floppy disk drive or other portable storage device. The computer may include one or more network interfaces. The network interface can include a network card for connecting to an Ethernet or other type of LAN. In addition, one or more of the network interfaces can include or be connected to a firewall. One of the network interfaces will typically be connected to the Internet or a LAN. I/O devices 314 can include one or more of the following: keyboard, mouse, monitor, display, printer etc. Software used to perform the methods of the present invention are likely to be stored in mass storage 306 (or any form of non-volatile memory), a portable storage media (e.g. floppy disk or tape) and/or, at some point, in memory 304. Various embodiments, versions, and modification of the system of FIG. 3 can be used to implement the present invention, and the above described hardware architecture is just one suitable example depicted in a generalized and simplified form. The present invention could include dedicated hardware, a firmware to implement the invention or other software and/or hardware architectures that are suitable.

Figure 4:
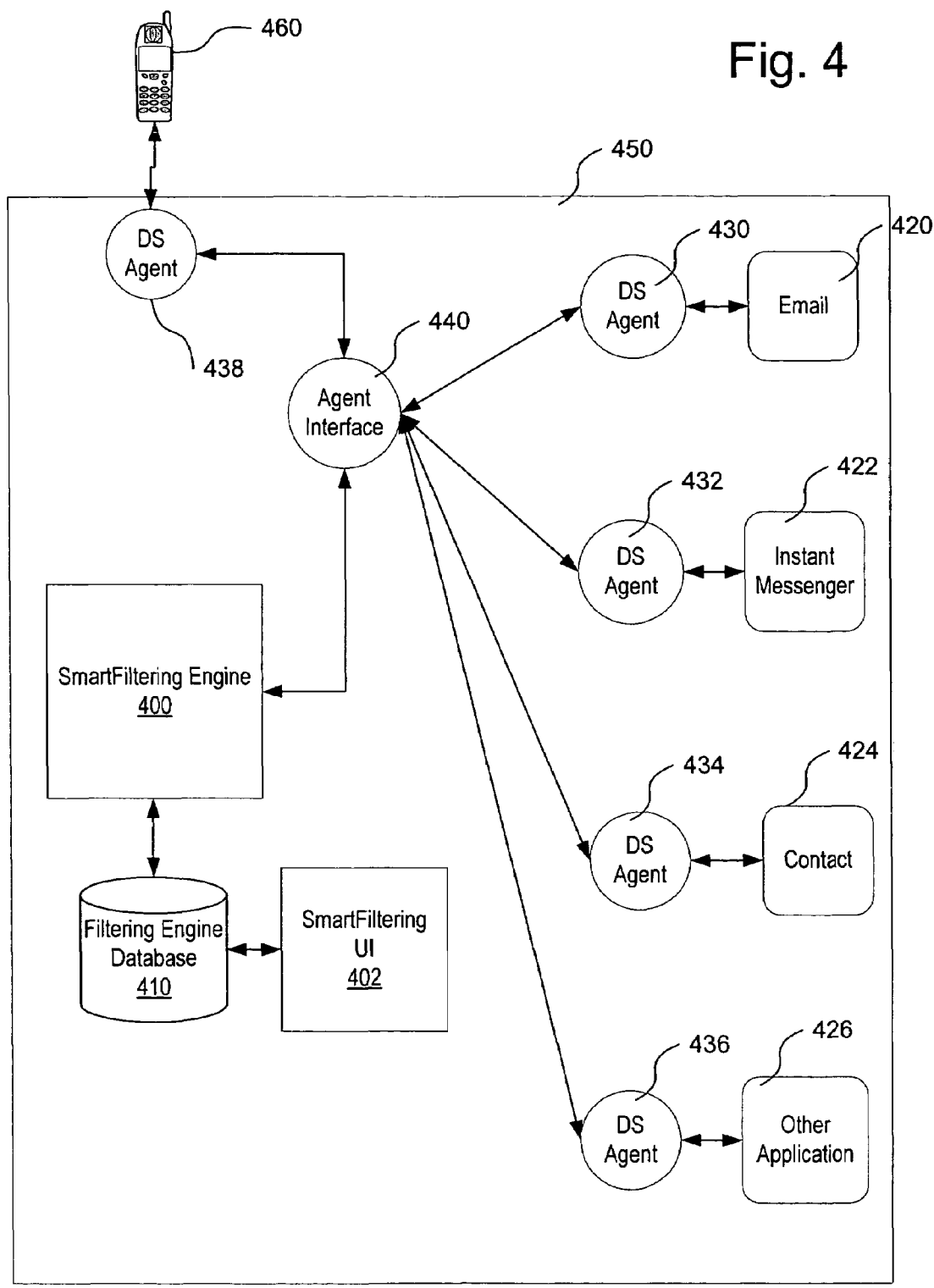
FIG. 4 is a functional diagram showing functional components of a first embodiment of the present invention.

FIG. 4 is a more detailed functional block diagram of a system for implementing the present invention. Shown in FIG. 4 are a smart filtering engine 400 and filtering engine database 410. Engine 400 and database 410 are equivalent to engine 100 and database 120 in FIG. 1. Box 450 represents an individual processing device such as that shown in FIG. 3. Device 450 includes a number of applications 420, 422, 424, and 426 which are available to the user and each include a data store associated therewith. For example, an e-mail application 420, which may comprise Microsoft's Outlook or a web e-mail application, includes its own data store of information, which includes e-mail information. The e-mail application may also include contact information, which is used by the user to maintain a list of contacts with whom the user e-mails. An alternative application is an instant messenger application 422, such as Yahoo® instant messenger, AOL® instant messenger, or MSN® messenger. Instant messenger application 422 may include information such as buddy lists and information as to the frequency of communication with each individual in the buddy list. A contact information application 424 may also be provided. An example of such an application includes not only Microsoft® Outlook, but Best Software, Inc.'s Act!® and similar types of applications. It should be understood that any other suitable application 426 which correlates data between a user controlled data element which, in the example shown in FIG. 2a, has been a contact element, may be utilized in accordance with the present invention. However, as will be explained in further detail below, the other application 426 need not solely relate to contact element data. For example, the application 426 might be a word processing application and the data interaction might be accessing a file. Alternatively, the other application might be a database application or a spreadsheet application. In either of these cases, accessing the database or the spreadsheet file may constitute interaction with data which may be utilized by the interaction analysis system of the present invention.

Each of the respective applications 420, 422, 424, 426 has associated therewith a data store agent. For example, email application 420 has a data store agent 430, instant messenger application 422 has a data store agent 432, contact manager application 424 has a data store agent 434, and other application 426 has a data store agent 436. Each of the data store agents 430, 432, 434, 436 communicates with an agent interface 440. The agent interface 440 is in communication with engine 400. Also shown in a data store agent 438 in communication with a phone 460, which may be a wire line, wireless or cellular telephone. Communication between the phone 460 and processing device 450 may be by a direct cable connection, a wire line network connection, a wireless network connection, or other means, such as short messaging service (SMS).

Each of the agents, engine and database may be operable from code provided on the mass storage device instructs the processor device to perform tasks associated with the agent, engine and database, with components of each provided in memory 304, mass storage 306 and/or portable storage 308.

Also shown is a user interface 402 allowing the user to instruct the system regarding device limits and individual aspects of data under consideration. Although the user interface 402 is shown as coupled to the database 402, independent code communicating with database 410 and engine 400 may be provided to implement the user interface 402. User interface 402 may take any number of forms, including a separate application, an application operable in a web browser, an application operable from within data applications 420, 422, 424, 426, or an application or interface operable from phone 460.

In general, each agent 430, 432, 434, 436, and 438 is designed to communicate with the associated application (or device) and extract data from the personal information store for analysis by the system of the present invention. In one embodiment, each agent extracts information on each interaction with the data; in other embodiments, the agents extract interaction information on a timed basis. A number of well known mechanisms exist for communicating with such applications, including use of associated application programming interfaces or API's. Information about the interaction, including the nature of the interaction and the data interacted with, is provided to agent interface 440. The agent interface 440 may be as simple as a port that the agents communicate through or may be a communication interface receiving agent specific communications. The interface 440 may also control when each of the agents queries the data store associated with each application to determine whether data interactions have taken place. It can provide bi-directional communications with devices and applications in the system. The interface presents a common communication mechanism for the engine, while each agent is generally specific to the application with which it must interact. Database 410 includes records associated with the interaction data. The nature of the records is shown in FIG. 7. In addition, database 410 may contain records on the results of the smart filtering engine analysis which are stored for later use by the system.

Figure 5:
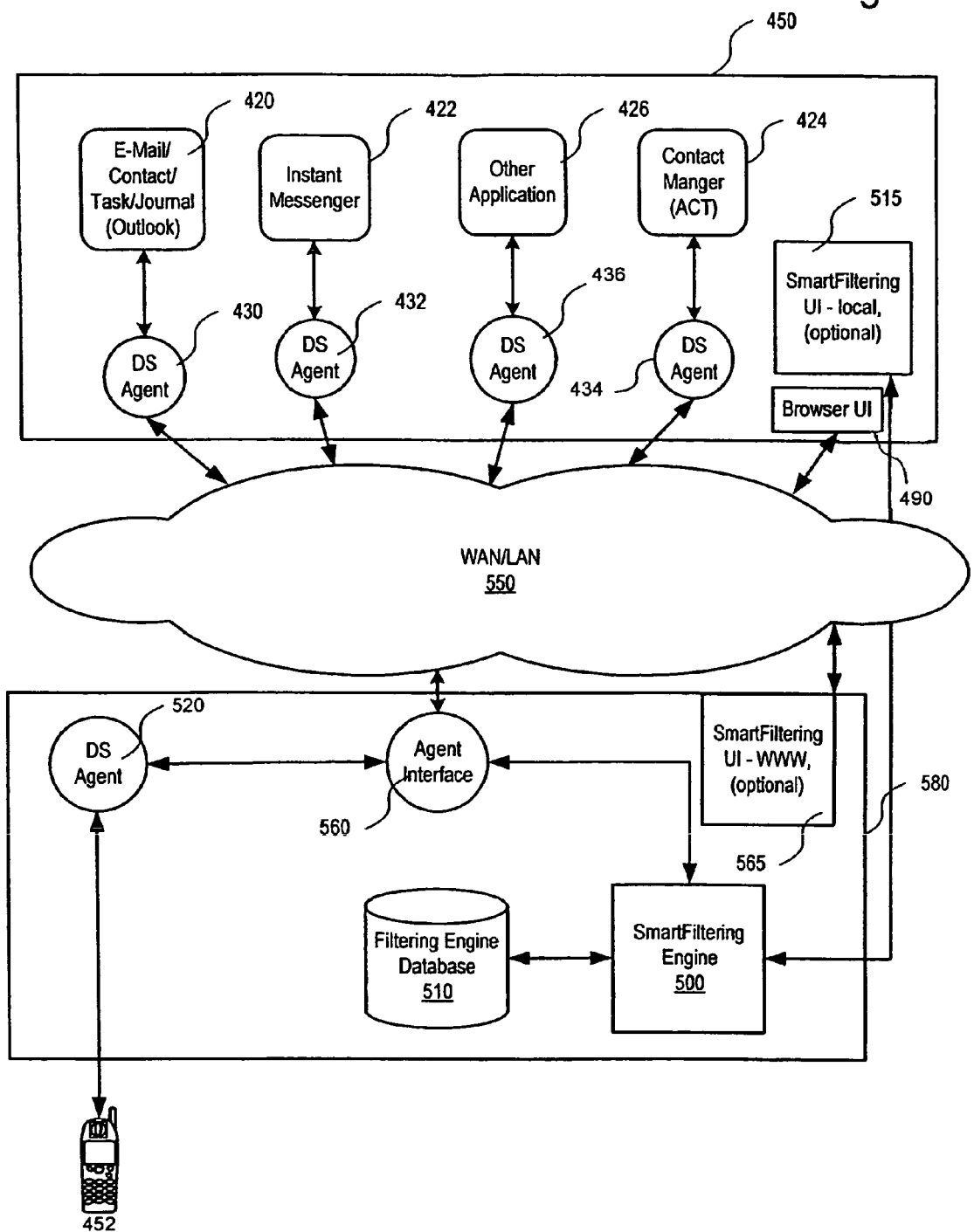
FIG. 5 is a diagram showing functional components of a second embodiment of the present invention.

FIG. 5 shows a networked embodiment of the present invention. In FIG. 5, like numerals represent like elements shown and described in the previous figures. In FIG. 5, each data store agent 430, 432, 434, 436, communicates information to a network 550. Network 550 may be a local area network, a wide area network, or a combination of public and private area networks, such as the Internet. Communications from each data store agent 430, 432, 434, 436, are directed to an agent interface 560 provided on a filtering server 580. Filtering server 580 may comprise one or more processing devices such as those shown and described with respect to FIG. 3. It should be understood that each of the processing elements 580 which perform processing functions may each be provided on their own dedicated server, or implemented on a single server and, in the case where individual dedicated servers are provided, may be coupled by a local or wide area network.

Agent interface 560 serves a similar function to agent interface 440 in FIG. 4. In one instance, it acts as a receiver for interaction data provided by the data store agents 430, 432, 434, 436, and 520. The interface 560 may also control when each of the agents queries the data store associated with each application to determine whether data interactions have taken place. It can provide bi-directional communications with devices and applications in the system. The interface 560 presents a common communication mechanism for the engine, while each agent is generally specific to the application with which it must interact. One difference in agent interface 560 from interface 440 is the ability to differentiate between users, as multiple users may connect via the network 550 to the server 580. Also shown on server 580 is a data store agent 520 which is provided to receive data interaction information from a mobile device such as a cellular telephone 452. Communication between mobile device 452 and agent 520 may be via a wired connection, a wireless connection, any of a number of wireless technologies such as SMS, or any suitable communications link. Also shown is a communications link between phone 452 via network 550.

Optionally, a first user interface 565 may be provided via the network and is served by server 580 via any of a number of known technologies, including TCP/IP, active server pages, and the like. This interface may be viewed by device 450 using a browser 490 on device 450. As an alternative to or in conjunction with interface 565, a local smart filtering interface 515 may be provided on processing device 450. The local interface may be similar to interface 402 except that it interacts with the engine on server 580 and agents 430, 432, 434, 436.

In the implementation shown in FIG. 5, users coupled to processing devices 450 or mobile devices 452 communicate data interactions with the components on the filtering server 580. Filtering server 580 can handle any number of multiple users and multiple processing devices. As described below, data from the individual users and processing devices will be identified and stored separately or identified separately in the filtering engine database 510. It should be understood that any number of processing devices 450 and mobile devices 452 may be coupled to and served by server 580.

It should be further recognized that agent 520 may be provided on device 450 (as shown in FIG. 6) and hence the embedded device agent in device 450 can communicate via the network connection of device 450 over the network 550 to interface 560. Agent interface 560 provides interaction data to a smart filtering engine 500 which is in communication with a filtering engine database 510. FIG. 6 illustrates a further embodiment of the data server agent wherein a data server agent 610 is embedded in a mobile device 650 and communicates directly with a smart filtering engine interface or directly with the smart filtering engine 500. Not shown in FIG. 6 are the connections to the smart filtering engine interface. However, it should be understood that the smart filtering engine is coupled as shown in FIGS. 4 and 5 to a filtering engine database user interface and agent interface.

FIG. 7 shows yet another example of a system for implementing the present invention. In FIG. 7, the smart filtering system is utilized in conjunction with a synchronization system such as that described in co-pending patent application Ser. Nos. 09/490,550, 09/491,675 and 09/491,694. In FIG. 7, processing device 450 and applications 420, 422, 424, and 426, as well as agents 430, 432, 434, and 436 are equivalent to those described above with respect to FIGS. 4 and 5. These agents couple to an agent interface 760 via the network 550. Agent interface 760 is in communication with the smart filtering engine 700 and filtering engine database 510 as described above. Agent interface 760 acts in a manner similar to interfaces 440 and 560.

In this embodiment, when changes to the data based on the user data interactions with applications 420, 422, 424, and 426 are to be made, smart filtering engine 700 communicates with a synchronization engine 710 which provides changes either directly to the data store agents 430, 432, 436, or 434, or to the application data stores associated with applications 420, 422, 426, 424, directly. It should be understood that other elements of the synchronization system such as that described in application Ser. Nos. 09/490,550, 09/491,675 and 09/491,694 may be provided in addition to the data store agents and application data stores in order to more efficiently synchronize data based on the technology used in the synchronization system. Data from multiple users is stored in filtering engine database 510 in a manner similar to described below.

As noted above, the number of different hardware configurations may be utilized to implement the method of the present invention. In general, the method involves data analysis of user interactions with the user's personal information space data, which in one case may be contact information, in order to provide the user a more relevant representation of the data that the user is interacting with based on some characteristic of how the user interacts with the data. In the implementations of the invention shown in FIGS. 4 through 7, the data store agents are acting as data accessors to provide interaction information from the data stores with which they are associated to the filtering engine of the present invention. Hence, whenever an interaction is undertaken on any data in the data store, this interaction will be identified to the agent interface. This interaction may be as simple as a telephone call or may be as involved as determining the amount and frequency of use of a data file and the characterization of the use of the data file for applications used by the user.

Figure 8:
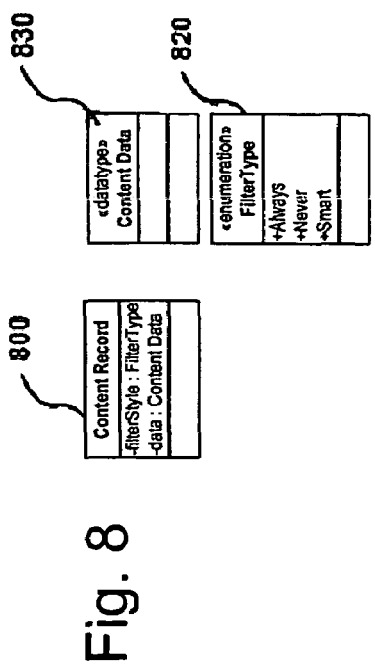
FIG. 8 is a UML representation of a content data record for Use in the present invention.
Figure 9:
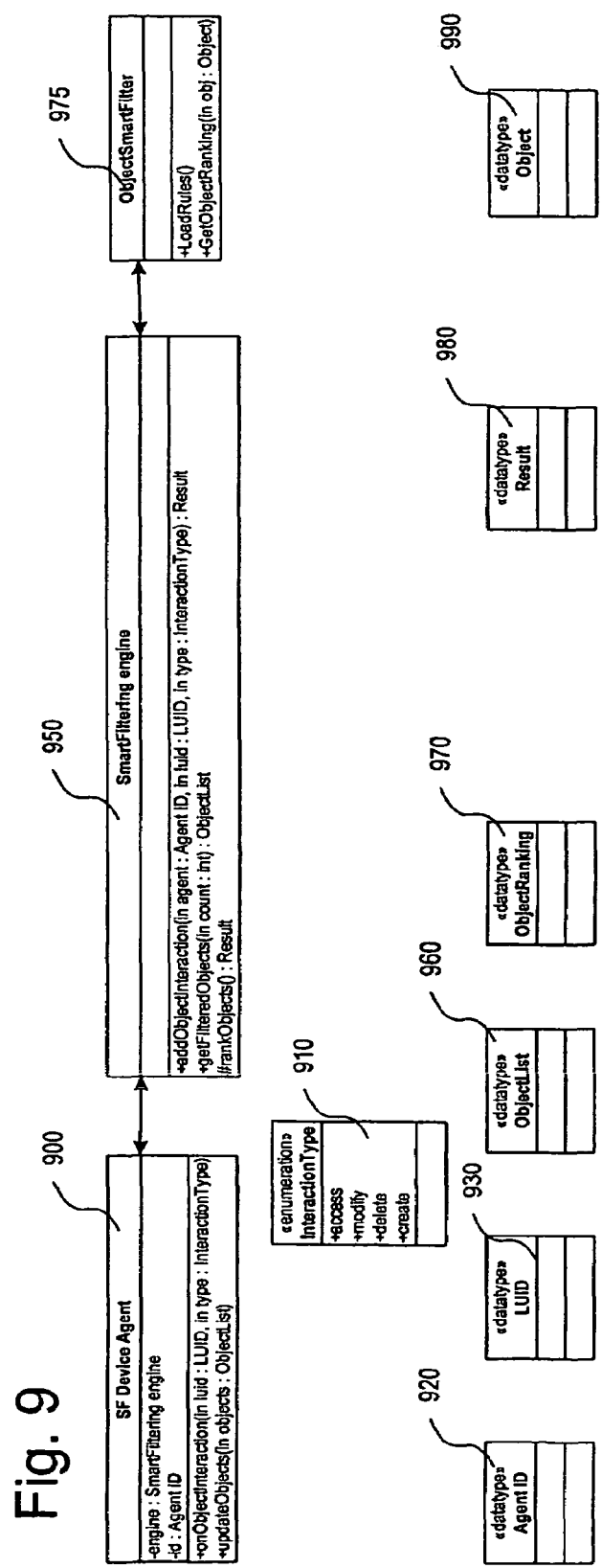
FIG. 9 is a UML representation of data interaction in the system of the present invention.

FIGS. 8 and 9 show exemplary data structures for records used in the present invention. FIG. 8 is a UML class model diagram showing the types of data in a given content record 800 used in conjunction with the system of the present invention. While FIG. 8 shows an example of a content record which may be stored in the filtering engine database 410, 510, it should be understood by those skilled in the art that the invention is not limited either to the particular data type (e.g. a "contact record") or the particular information stored with the data type.

As shown therein, each content record 800 includes a filter type 820 and content data 830. The filter type is a three-state variable ("never", "always" "smart") which may be selected by the user or by automated means to enumerate whether the content data should never be present in a device, always be present in a device, or updated according to the characterization by the smart filtering engine of the present invention. If a user wishes to ensure that a particular piece of content is never included as part of the rated information or part of the device, the user can set a this variable by means of the user interface so that the system will never include this data in any update of the device (step 255). If, for example, the user wishes to always include the content in the user's personal information space, the always flag will be set. In an alternative embodiment, the filter type 820 may provide an indicator as to whether the record is subjected to evaluation. For example, returning to FIG. 2*b*, in the evaluation step 235, records having an "always" and "never" filter type may be removed from the evaluation and only those having a "smart" evaluation analyzed. This improves the efficiency of the analysis and the process at step 235.

By way of an additional example, suppose the user has a number of phone book entries that the user wishes to always include in the user's phone. The user may set the always flag for each of these entries to ensure that the smart filtering system of the present invention does not remove them for lack of use. Likewise, the user may select certain entries to never be included in the user's phone address book. Alternatively, the user can let the smart filtering engine operate on the piece of data in conjunction with the rules set forth for the particular type of data in use.

Content record 800 also includes content data 830. Types of content data which may be included in the content data field include a phone call record, a meeting record, a web conference record, file access, a file multiplication, a task entry, an instant message, contact data such as an e-mail address, telephone number or address, an instant messaging address, a journal entry, or any other type of data accessed by a user in a personal information space.

FIG. 9 shows UML state charts and a class representation of the device agent 900, smart filtering engine 950 and a rule engine 975. In the previous figures, the smart filtering engine and rule engine have been combined to a single box indicated by the smart filtering engine. However, in order to provide additional detail for the present invention, these two components have been separated. It should be understood that a particular architecture used in the present invention may be varied in accordance with the scope of the invention. The device engine 900 will include two identifiers, an engine identifier and an ID identifier.

As shown in FIG. 9, device agent 900 has attributes of an engine identifier (-engine) denoting smart filtering engine 950 as the engine to utilize for communications and an agent ID identifier 920 which identifies the device agent to the smart filtering engine. Two methods for device engine 900 are shown: on ObjectInteraction and updateObjects. The on ObjectInteraction behavior returns the local user ID (LUID) 930 and InteractionType data 910 to identify the particular action for a record to the smart filtering engine. The on ObjectInteraction behavior provides the local ID and interaction type to the smart filtering engine. InteractionType contains four attribute types of data interactions for, in this example, contact data, which are: access, modify, delete and create. It will be understood that for different personal information, other interaction attributes may exist as specified herein. The updateObjects behavior updates an object list data 960 in the content data record of the particular application in communication with device agent 900.

SmartFiltering engine 950 includes three methods: addObjectInteration, getFilteredObjects and rankObjects. The addObjectInteraction method uses the Agent ID, local user ID (LUID) and Interaction Type to add the object to the list of objects to be filtered. The getFilteredObjects method returns an ObjectList 960 of all objects added by addObjectInteraction. Finally, rankObjects takes the ObjectList and provides a Result based on the filtering rules provided by the rule engine 975. ObjectSmartFilter 975 includes a LoadRules method and a GetObjectRanking method. The LoadRules method allows for adding of specific filter rules (LoadRules) from a filter element. The getFilteredObjects method retrieves ranked object characteristics to be evaluated from the filter element.

Figure 10:
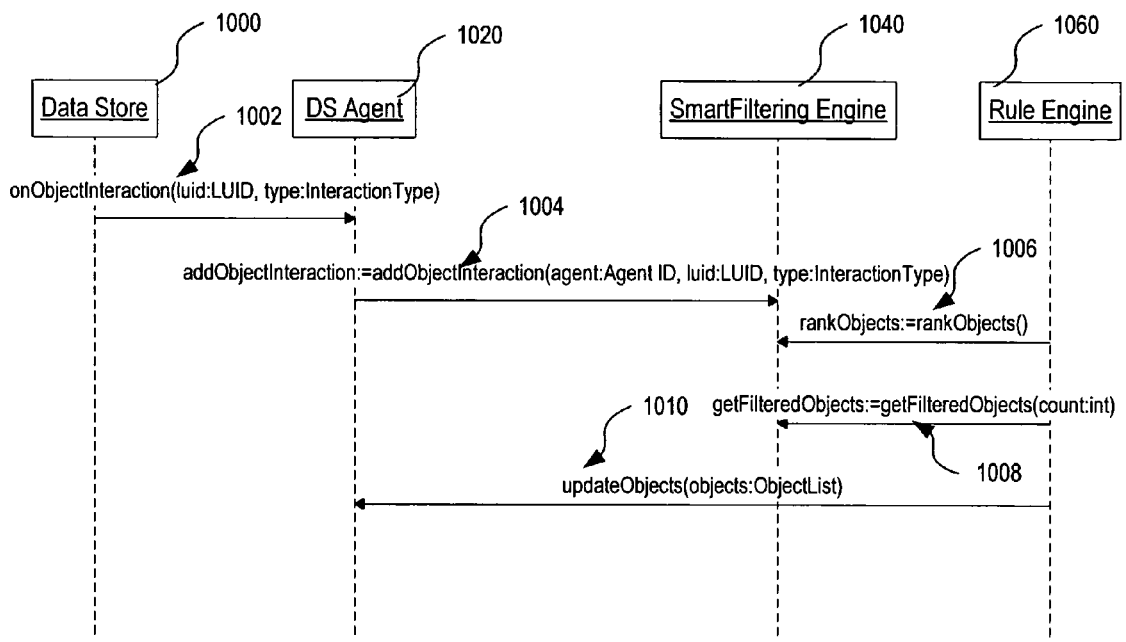
FIG. 10 is a sequence diagram showing a first set of interactions of functional components of the present invention.
Figure 11:
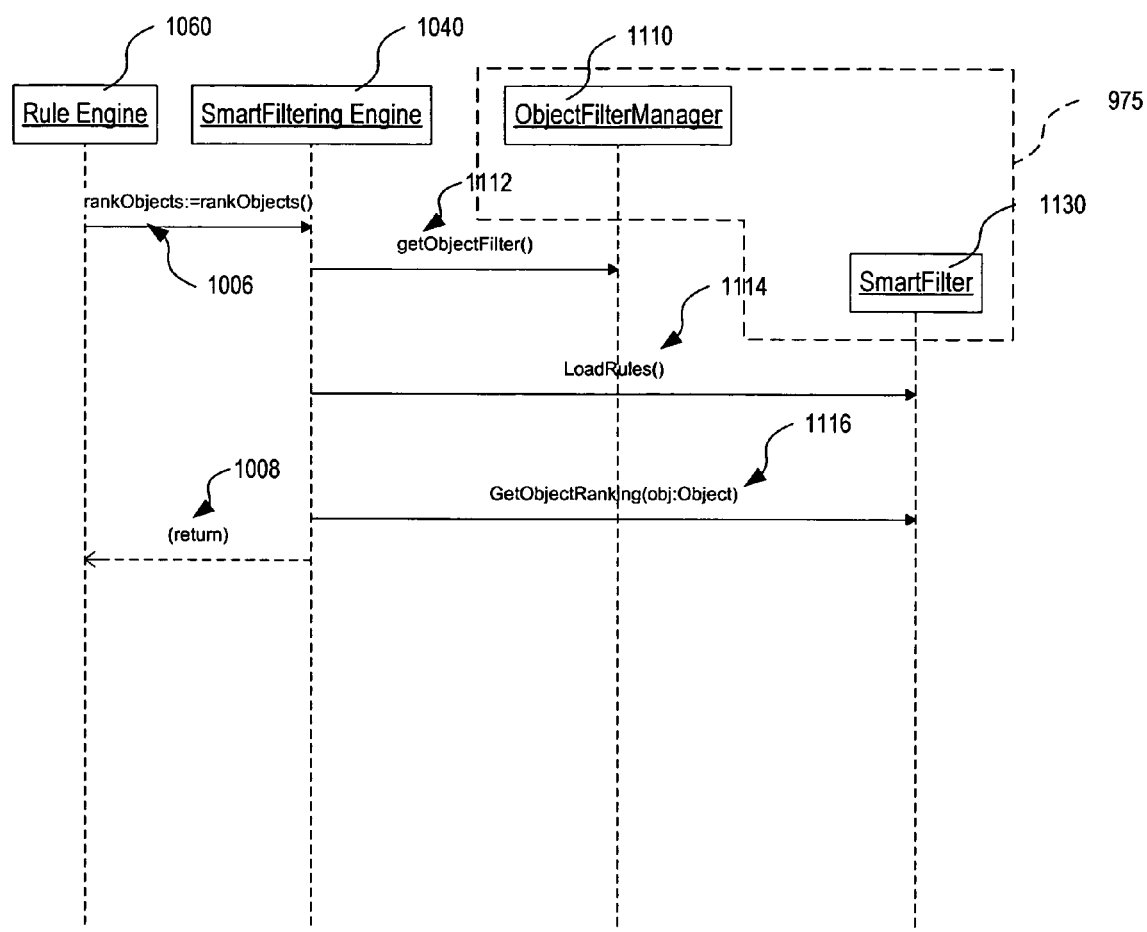
FIG. 11 is a sequence diagram showing a second set of interactions of functional components of the present invention.
Figure 12:
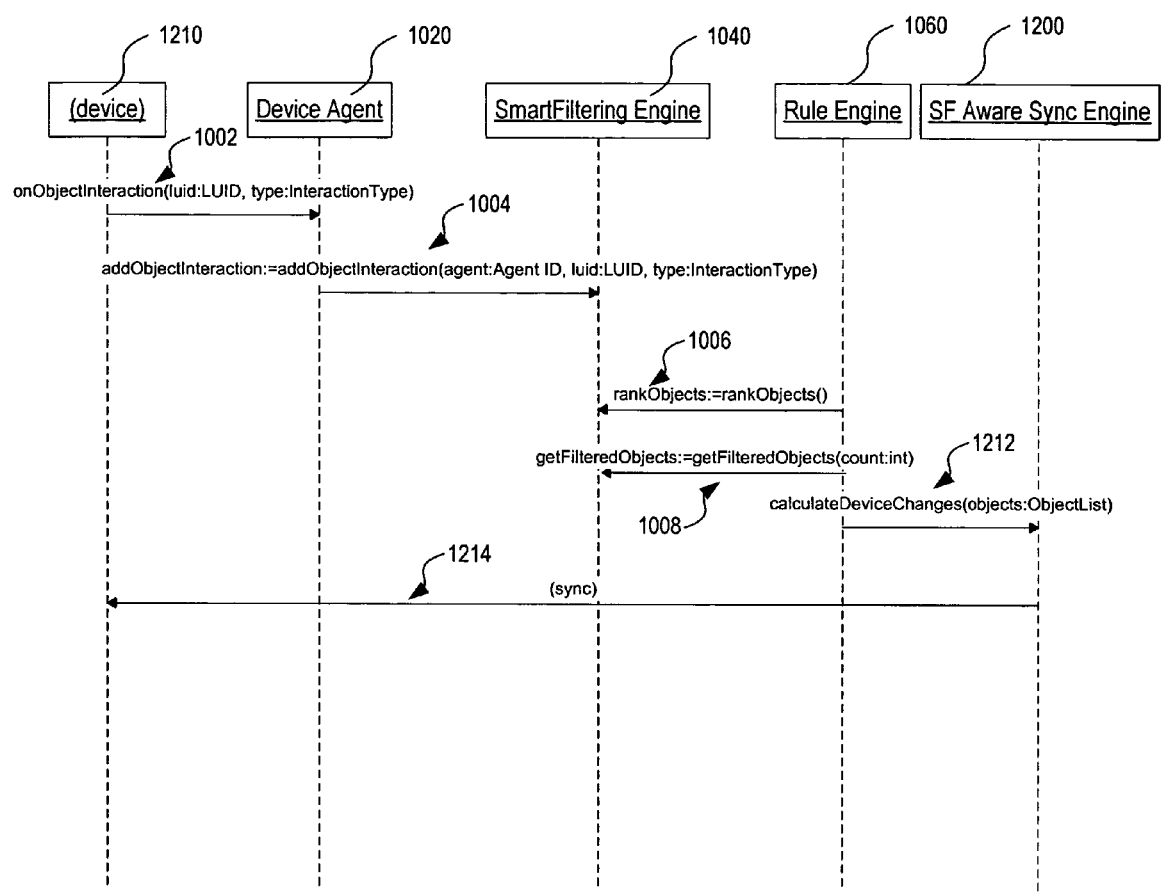
FIG. 12 is a sequence diagram showing a third set of interactions of functional components of the present invention.

FIGS. 10-12 are sequence diagrams illustrating the operation of the methods shown in FIG. 9. As shown in FIG. 10, when an object interaction in the data store 1000 occurs by a user, the on ObjectInteration method provides the LUID and InteractionType at 1002 to the data store agent 1020. In the data store agent 1020, the addObjectInteraction method then provides the Agent ID, LUID and InteractionType at 1004 to the smart filtering engine 1040. The rankObjects method at 1006 then returns the object ranking based on the analysis rules provided to the rule engine 1060, and the getFilteredObjects returns the filtered objects at 1008. Finally, the updateObjects method returns the object list to the data store agent at 1010 to be updated by the smart filtering engine 1040.

FIG. 11 represents the interaction between the SmartfilteringEngine 1040 and the ObjectSmartFilter 975. In FIG. 11, the ObjectSmartFilter 975 is shown as broken down into an object filter manager 1110, and a smart filter element 1130. The filter manager 1110 allows one to instantiate different, customizable filters 1130 for different data types. When the rule engine 1060 is issued a function call 1006 by the rankObjects method, the getObjectFilter function call 1112 is issued to the object filter manager filter manager 1110, and the LoadRules method 1114 and GetObjectRanking 1116 methods are invoked to return the filtering rules and object ranking, respectively, from the Smart Filter element 1130. These are returned to the Rule Engine 1060 to implement updateObjects method, as illustrated in FIG. 10.

Other methods in addition to rating methods may be returned. For example, methods which allow elements of personal information to be associated with other elements in other applications may be returned. For example, suppose a user installs and begins use of an instant messaging application. Members of the user's communication list in the instant messenger application will likely have corresponding entries in the user's contact application. Upon entry and use of an instant messing contact, the object interaction call may call a method which attempts to match the instant messaging information to the contact information. Once matched, this association between the contact and the instant message can allow more sophisticated forms of rating, such as determining preferred methods for contacting a member of a user's contact datastore, or determining most frequently contacted individuals across multiple platforms of communication. This information may further be used to populate similar data fields across different applications. For example, one may use the new instant messaging application information to add information to the contact data store, and vice-versa. In this context, for example, each contact may be assigned a general unique identification number which is associated with a local user identification number by the aforementioned method.

Yet another alternative of the present invention involves performing the rating and filtering in various time sequenced contexts. In one context, analysis is performed on all information in a data store without storing the information in a separate database. This method is therefore performed in real time. Another embodiment involves storing one or more ratings and analyzing results of interactions at regular intervals. Yet another embodiment involves performing a real-time analysis concurrently with a storage analysis, and allowing the user to select between the different temporal representations of the user's interaction with the data in their personal information space.

FIG. 12 shows yet another alternative wherein a smart filtering aware synchronization engine 1200 is used in conjunction with a device agent 1020, smart filtering engine 1040 and rule engine 1060. In this instance, the smart filtering engine 1040 does not return the filtered data directly to the device agent, but rather the rule engine calculates the changes and provides them to the smart filtering aware sink engine 1200 which then sinks directly to device 1210. Hence, in FIG. 12, following the return of the filtered objects at 1008, a calculateDeviceChanges method instructs the sync engine 1200 to generate the changes required to update the data in the device 1210. The sync engine 1200 then generates the changes and syncs to the device 1210 at 1214 in accordance with the teachings of application Ser. Nos. 09/490,550, 09/491,675 and 09/491,694. In this manner, the system of the present invention can be used in conjunction with any number of different sync systems.

The foregoing detailed description of the invention has been presented for purposes of illustration and description. It is not intended to be exhaustive or to limit the invention to the precise form disclosed. Many modifications and variations are possible in light of the above teaching. Additionally, while the above description provided an example using the protocols and addressing currently used on the Internet, the present invention can be used with other protocols and addressing schemes. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A system for organizing information in a personal information space, the personal information space including at least one data source on a first processing device holding at least a portion of the personal information space, comprising:
    an element comprising an agent, on the first processing device, specific to the element, the agent communicating with a data source associated with the element and providing interaction data regarding data in the data source, the interaction data including at least one of the amount of use of a data file, the frequency of use of the data file and the characterization of the use of the data file;
    an interaction evaluation engine on a second processing device for directly extracting the interaction data from the data source via the agent, the engine evaluating the interaction data and returning an output reflecting one or more weighting characteristics of the interaction data, wherein the evaluating comprises using a combination of two or more weighting characteristics; and
    a data output device capable of communicating the output to a user.

2. The system of claim 1 wherein the interaction data is stored in the data source.

3. The system of claim 1 wherein the interaction data is stored in a system database.

4. The system of claim 1 further including rating data, the rating data including a user input flag determining whether an object of data in the data source is always provided to a smart filtering engine, never provided to the smart filtering engine or subject to the interaction engine.

5. The system of claim 1 wherein the data source is a contact database.

6. The system of claim 1 wherein the user interaction includes a telephone call with a contact.

7. The system of claim 1 wherein the data includes using a contact email address.

8. The system of claim 1 wherein the data includes an instant messenger identifier.

9. The system of claim 1 wherein the data source is a word processing file.

10. The system of claim 1 wherein the data source is a database file.

11. The system of claim 1 wherein the data is a task entry in a personal information manager.

12. The system of claim 1 wherein the data is a calendar appointment.

13. The system of claim 1 wherein the data is meeting request.

14. The system of claim 1 wherein the data is a journal entry in a personal information manager.

15. The system of claim 1 wherein the data source is a spreadsheet file.

16. The system of claim 1 wherein the data source is a binary file modifiable by a user.

17. The system of claim 1 wherein the data is stored in a data structure.

18. The system of claim 17 wherein the data includes an action flag.

19. The system of claim 18 wherein the action flag signifies a level of importance.

20. The system of claim 17 wherein the data structure includes a user ID.

21. The system of claim 17 wherein the data structure includes a device agent ID.

22. The system of claim 17 wherein the data structure includes an object rating.

23. The system of claim 17 wherein the data structure includes an object list.

24. The system of claim 17 wherein the data structure includes object content data.

25. The system of claim 1 wherein the one or more weighting characteristics includes the frequency of use of the data source.

26. The system of claim 1 wherein the one or more weighting characteristics includes the amount of use of the data source.

27. The system of claim 1 wherein the one or more weighting characteristics includes the length of time between contacts with the data.

28. The system of claim 1 wherein the one or more weighting characteristics includes the duration of the interaction with the data source.

29. The system of claim 1 wherein the one or more weighting characteristics includes the area of use of the data source.

30. The system of claim 1 wherein the one or more weighting characteristics includes the type of data used within the data source.

31. The system of claim 1 wherein the one or more weighting characteristics includes the type of application used to generate the interaction.

32. The system of claim 1 wherein the one or more weighting characteristics includes a pattern of use defined by one or more additional characteristics selected from the list of: frequency of use, amount of use, length of time between interactions with the data, duration of the interactions with the data, the area of the data source used, the type of data source used, and the application used to access the data source.

33. The system of claim 1 wherein the interaction engine includes an output of an update to the data source.

34. The system of claim 33 wherein the interaction engine includes an output for multiple data sources.

35. The system of claim 34 wherein the multiple data sources are on different devices.

36. The system of claim 1 wherein the system is provided on a single processing device.

37. The system of claim 1 wherein the element is chosen from the group consisting of applications and devices, wherein the element is associated with the data source.

38. The system of claim 1 further including a user interface.

39. The system of claim 38 wherein the user interface includes a weighting selection interface.

40. The system of claim 38 wherein the user interface includes an action selection interface.

41. The system of claim 38 wherein the user interface includes a conflict resolution interface.

42. A method operable on a computing device in communication with a server, the method capable of managing a user's personal contact information from one or more data sources on the computing device, each data source comprising a device or application storing contact information used by the user in a personal information space and communicating with the computing device via a network, comprising:
   determining when an interaction with a contact on a data source occurs;
   evaluating interaction data by using a combination of two or more characteristics of the interaction data to determine an at least one trait about the interaction, wherein the interaction data is directly extracted from the data source for the evaluation;
   generating a result based on said step of evaluating; and
   communicating the result to the server via an agent specific to the data source.

43. The method of claim 42 wherein the interaction is an email.

44. The method of claim 42 wherein the interaction is a phone call.

45. The method of claim 42 wherein the interaction is a scheduled meeting.

46. The method of claim 42 wherein the interaction is a web conference.

47. The method of claim 42 wherein the interaction is a file access.

48. The method of claim 42 wherein the interaction is a file modification.

49. The method of claim 42 wherein the interaction is a task entry.

50. The method of claim 42 wherein the interaction is an instant message.

51. The method of claim 42 wherein the data source is a PIM information store.

52. The method of claim 42 wherein the data source is a PDA information store.

53. The method of claim 42 wherein the data source is a mobile device call list.

54. The method of claim 42 wherein the data source is an Internet messaging message list.

55. The method of claim 42 wherein the data source is a Web Conference attendee list.

56. The method of claim 42 wherein the data source is a Contact list.

57. The method of claim 42 further including updating the data source from which the data interaction occurred.

58. The method of claim 42 further including updating a series of data sources for the user.

59. The method of claim 42 wherein characteristic is the frequency of interaction with the data in the data source.

60. The method of claim 42 wherein characteristic is the amount of use.

61. The method of claim 42 wherein characteristic is the length of time between interactions with data in the data source.

62. The method of claim 42 wherein characteristic is the duration of the interaction with the data in the data source.

63. The method of claim 42 wherein characteristic is the type of data with which the interaction occurs.

64. The method of claim 42 further including providing a user selection of said step of evaluating such that, for each data type or application type, the user can select whether an evaluation occurs.

65. The method of claim 64 wherein the user can select to always have said step of evaluating occur.

66. The method of claim 64 wherein the user can select to never have said step of evaluating occur.

67. A method on a server in communication with a client device, the method capable of characterizing information acted upon by a user, comprising:
   receiving an indication of a data interaction with the user from the client device, thereby directly acquiring a set of user data interactions from a data source on the client device for evaluation;
   for the set of user data interactions, evaluating by an interaction evaluation engine interaction information based on using a combination of two or more characteristics of the interaction, the interaction information including at least one of the amount of use of a data file, the frequency of use of the data file and the characterization of the use of the data file;
   weighing elements of the interaction information based on said step of evaluating; and
   storing a result of said step of weighing elements of the interaction information.

68. The method of claim 67 wherein the data interaction includes interaction with a data application.

69. The method of claim 67 wherein the data interaction includes interaction with a device.

70. The method of claim 67 wherein the set of user data interactions includes one interaction.

71. The method of claim 67 wherein the set of user data interactions includes a plurality of interactions.

72. The method of claim 67 further including outputting a list of the interaction information based on said step of weighing.

73. The method of claim 72 further including updating a data source associated with a device or application.

74. The method of claim 67 wherein the set of user data interactions includes a series of interactions gathered over time.

75. The method of claim 67 wherein the set of user data interactions includes an individual transaction and the step of evaluating is performed for each interaction received.

76. The method of claim 67 wherein the device is a mobile device.

77. The method of claim 76 wherein the user data interactions are telephone calls.

78. The method of claim 77 wherein the step of weighing includes determining the frequency of use of a contact based on said telephone calls in the cellular phone.

79. The method of claim 78 further including updating an internal phone book in the cellular phone with contact records.

80. A system for managing data between at least a first device and a second device, the devices communicating with a server via at least one network, the first device including at least one data store having personal information associated with a user, comprising:

an element comprising an interaction agent on the first device, the interaction agent specific to the element and communicating with a data store on the first device, wherein the element is associated with the data store;

a processor on the server capable of running an evaluation engine on the second device, the evaluation engine for directly extracting interaction information from the data store via the interaction agent and evaluating user communication, wherein the evaluating comprises using a combination of two or more interaction weighting characteristics; and a database communicating with the evaluation engine and including the interaction information and the interaction weighting characteristics for at least one user, wherein the interaction information including at least one of the amount of use of a data file, the frequency of use of the data file and the characterization of the use of the data file.

81. The system of claim 80 further including a change transaction generation engine providing updates to said at least one data store based on an output of the evaluation engine.

* * * * *

UNITED STATES PATENT AND TRADEMARK OFFICE
CERTIFICATE OF CORRECTION

PATENT NO. : 7,634,509 B2 Page 1 of 1
APPLICATION NO. : 10/704443
DATED : December 15, 2009
INVENTOR(S) : Onyon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 707 days.

Signed and Sealed this

Ninth Day of November, 2010

David J. Kappos
*Director of the United States Patent and Trademark Office*